(12) United States Patent
Okamoto

(10) Patent No.: US 9,579,852 B2
(45) Date of Patent: Feb. 28, 2017

(54) METHOD FOR MANUFACTURING THREE-DIMENSIONAL SHAPED OBJECT

(71) Applicant: SEIKO EPSON CORPORATION, Tokyo (JP)

(72) Inventor: Eiji Okamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 178 days.

(21) Appl. No.: 14/600,459

(22) Filed: Jan. 20, 2015

(65) Prior Publication Data

US 2015/0210016 A1 Jul. 30, 2015

(30) Foreign Application Priority Data

Jan. 30, 2014 (JP) .................................. 2014-015227

(51) Int. Cl.
    *B29C 33/52* (2006.01)
    *B29C 67/00* (2006.01)
    (Continued)

(52) U.S. Cl.
CPC ......... *B29C 67/0092* (2013.01); *B22F 3/1055* (2013.01); *B28B 1/001* (2013.01); *B29C 33/448* (2013.01); *B29C 67/0081* (2013.01); *B22F 2003/1058* (2013.01); *B29K 2033/04* (2013.01); *B29K 2105/0032* (2013.01); *B29K 2105/0058* (2013.01); *B29K 2105/251* (2013.01); *B33Y 10/00* (2014.12); *B33Y 70/00* (2014.12); *Y10T 428/24893* (2015.01)

(58) Field of Classification Search
CPC ............ B22F 3/1055; B22F 2003/1056; B22F 2003/1057; B22F 2003/1058; B22F 2003/1059; B28B 1/001; B29C 33/44; B29C 33/448; B29C 33/52; B29C 33/54; B29C 67/0051; B29C 67/0081; B29C 67/0085; B29C 67/0088; B29C 67/0092; B29C 67/0096; B33Y 10/00; B33Y 70/00
USPC .................. 264/113, 308, 317; 700/118, 119
See application file for complete search history.

(56) References Cited

U.S. PATENT DOCUMENTS 5,204,055 A 4/1993 Sachs et al.
6,007,318 A 12/1999 Russell et al.
(Continued)

FOREIGN PATENT DOCUMENTS

JP 06-218712 A 8/1994
JP 2004-262243 A 9/2004
(Continued)

*Primary Examiner* — Leo B Tentoni
(74) *Attorney, Agent, or Firm* — Global IP Counselors, LLP

(57) ABSTRACT

In a method for manufacturing a three-dimensional shaped object in which layers formed by ejecting and curing ink including a curing resin are laminated, the method includes a layer forming process of forming the layers by using a composition for three-dimensional shaped object including powder for three-dimensional shaped object, and an ink ejecting process of ejecting an object formation ink and a sacrificial layer formation ink to the layers. In the ink ejecting process, the object formation ink and the sacrificial layer formation ink penetrate into the layers while forming a boundary between a region where the object formation ink penetrates in the layers and a region where the sacrificial layer formation ink penetrates into the layers.

10 Claims, 8 Drawing Sheets

(51) Int. Cl.
  *B28B 1/00*   (2006.01)
  *B29C 33/44*  (2006.01)
  *B29K 33/04*      (2006.01)
  *B29K 105/00*     (2006.01)
  *B33Y 10/00*      (2015.01)
  *B33Y 70/00*      (2015.01)
  *B22F 3/105*      (2006.01)

(56) References Cited

U.S. PATENT DOCUMENTS

| | | |
|---|---|---|
| 7,862,320 B2 | 1/2011 | Kumagai et al. |
| 2004/0169699 A1 | 9/2004 | Hunter et al. |
| 2007/0007698 A1 | 1/2007 | Sano |
| 2010/0028645 A1* | 2/2010 | Maguire ............ B28B 1/001 264/401 X |

FOREIGN PATENT DOCUMENTS

| | | |
|---|---|---|
| JP | 2009-012413 A | 1/2009 |
| JP | 2009-040032 A | 2/2009 |
| JP | 4432409 B2 | 3/2010 |
| JP | 5059832 B2 | 10/2012 |

* cited by examiner

METHOD FOR MANUFACTURING THREE-DIMENSIONAL SHAPED OBJECT

CROSS-REFERENCE TO RELATED APPLICATIONS

This application claims priority to Japanese Patent Application No. 2014-015227 filed on Jan. 30, 2014. The entire disclosure of Japanese Patent Application No. 2014-015227 is hereby incorporated herein by reference.

BACKGROUND

Technical Field

The present invention relates to a method for manufacturing a three-dimensional shaped object and a three-dimensional shaped object.

Related Art

A technology in which a three-dimensional object is formed by solidifying power by using coupling liquid is well-known (see Japanese Laid-open Patent Application Publication No. 6-218712 as an example). In this technology, the following operations are repeated to form the three-dimensional object. Initially, a powder layer is formed by thinly spreading the powder with uniform thickness, and the power is coupled by ejecting the coupling liquid in a desired part of the powder layer. As a result, the powder is coupled in only the part of the powder layer where the coupling liquid was ejected, and a thin plate-shaped member (hereinafter referred to as "cross-section member") is formed. After that, on the powder layer, an additional powder layer is thinly formed, and the coupling liquid is ejected to the desired portion. As a result, in the portion of the newly formed powder layer where the coupling liquid was ejected, a new cross-section member is also formed. At this point, the coupling liquid ejected on the powder layer penetrates to reach the previously formed cross-section member so that the newly formed cross-section member is bonded to the previously formed cross-section member. By repeating such operations, the thin plate-shaped cross-section members are laminated one-layer by one-layer so as to form the three-dimensional object.

With such three-dimensional shaped object forming technology, an object can be immediately formed by coupling the powder as long as the three-dimensional shape data of the object to be formed is provided, and it is not required to make a mold for forming the object in advance so that the three-dimensional object can be promptly formed at low cost. Also, a thin plate-shaped cross-section member is laminated one-layer by one-layer to form the object so that even if the object has a complex inner structure, the object can be integrally formed without separating into a plurality of components.

However, the coupling liquid ejected to the powder layer does not directly penetrates from an impact position to the inside of the powder layer so that in a conventional method for manufacturing the three-dimensional shaped object, there is a problem that a part corresponding to the outer surface of each layer of the three-dimensional shaped object is unevenly formed due to the ink spread. Further, there is a problem that by laminating such layers, it causes irregular steps (unevenness) formed on the outer surface of the three-dimensional shaped object.

SUMMARY

An object of the present invention is to provide a method for manufacturing a three-dimensional shaped object that prevents irregular steps (unevenness) from occurring on the outer surface and has a smooth outer surface so as to efficiently manufacture the three-dimensional shaped object with high dimensional accuracy. Also, an object of the present invention is to prevent irregular steps (unevenness) from occurring on the outer surface and provide a three-dimensional shaped object having a smooth outer surface and high dimensional accuracy.

Such objects can be achieved by the present invention as follows.

A method for manufacturing a three-dimensional shaped object according to one aspect of the invention in which layers formed by ejecting and curing ink including a curing resin are laminated includes forming the layers by using a composition for three-dimensional shaped object including powder for three-dimensional shaped object constituted by particles, and ejecting an object formation ink to form a region where the three-dimensional shaped object is provided and a sacrificial layer formation ink to form a sacrificial layer in a region at a side of an outermost layer of the three-dimensional shaped object, which is adjacent to a region to become the outermost layer of the three-dimensional shaped object. During the ejecting, the object formation ink and the sacrificial layer formation ink penetrate into the layers while forming a boundary between a region where the object formation ink penetrates in the layers and a region where the sacrificial layer formation ink penetrates into the layers.

Therefore, it prevents irregular steps (unevenness) from occurring on the outer surface, and the method for manufacturing a three-dimensional shaped object that manufactures the three-dimensional shaped object with high dimensional accuracy can be provided.

In the method for manufacturing the three-dimensional shaped object according to the aspect of the invention, the ejecting includes performing the ejecting of the object formation ink and the ejecting of the sacrificial layer formation ink within the same scanning, or within 100 milliseconds.

Therefore, a boundary surface which is approximately parallel to a thickness direction of the layers.

In the method for manufacturing the three-dimensional shaped object according to the aspect of the invention, an infiltration rate of the object formation ink and the sacrificial layer formation ink to the layers is preferably adjusted.

Therefore, a degree of the inclination of the boundary surface, which is formed between the region where the object formation ink penetrates into the layers and the region where the sacrificial layer formation ink penetrates into the layers, with respect to the thickness direction of the layers can be adjusted.

In the method for manufacturing the three-dimensional shaped object according to the aspect of the invention, adjustment of the infiltration rate of the object formation ink and the sacrificial layer formation ink is preferably performed by adjusting an ejecting amount of the object formation ink and the sacrificial layer formation ink.

Therefore, the infiltration rate of each ink can be easily adjusted.

In the manufacturing method of the three-dimensional shaped object according to the aspect of the invention, a curing material of the sacrificial layer formation ink preferably has hydrophilicity.

Therefore, it is possible to easily remove the sacrificial layer by aqueous liquid such as water, etc.

In the method for manufacturing the three-dimensional shaped object according to the aspect of the invention, the sacrificial layer formation ink preferably includes one or more elements selected from a group composed of tetrahydrofurfuryl(meth)acrylate, ethoxyethoxyethyl (meth)acrylate, polyethylene glycol di(meth)acrylate, (meth)acryloyl morpholine, and (meth)acrylic acid 2-(2-vinyloxyethoxy) ethyl.

Therefore, the sacrificial layer formation ink can be cured in more appropriate curing rate, and the productivity of the three-dimensional shaped object can be particularly excellent. Further, the hydrophilicity of the curing material can be more excellent so that the sacrificial layer can be easily removed.

In the method for manufacturing the three-dimensional shaped object according to the aspect of the invention, the object formation ink includes one or more elements selected from a group composed of (meth)acrylic acid 2-(2-vinyloxyethoxy)ethyl, polyether-based aliphatic urethane(meth)acrylate oligomer, 2-hydroxy-3-phenoxypropyl(meth)acrylate, and 4-hydroxybutyl(meth)acrylate.

Therefore, the object formation ink can be cured in more appropriate curing rate, and the productivity of the three-dimensional shaped object can be excellent.

In the method for manufacturing the three-dimensional shaped object according to the aspect of the invention, as the object formation ink, in addition to a colored ink including a coloring agent, a colorless ink that does not include the coloring agent is used, the colorless ink is preferably used to form a region of the outermost layer, and the colored ink is preferably used to form a region positioned further inside than the outermost layer.

The part including the coloring agent (specifically, pigments) gets more brittle than the part where the coloring agent is not included so that it is easily scratched or chipped, but by providing the region (coating layer) formed by using the object formation ink that does not include the coloring agent, it can effectively prevent such problem from occurring.

In the method for manufacturing the three-dimensional shaped object according to the aspect of the invention, as the colored ink including the coloring agent, color ink and white ink are used, the white ink is preferably used to form a region inside than a region formed by using the colored ink.

Therefore, the region where the object formation ink of white is applied can demonstrate concealability, and colorfulness of the three-dimensional shaped object 1 can be enhanced.

In the method for manufacturing the three-dimensional shaped object according to the aspect of the invention, when a refractive index of the particles is denoted as n1, and when a refractive index of the curing material of the curing resin included in the object formation ink is denoted as n2, a relationship of |n1−n2|≤0.2 is preferably satisfied.

Therefore, it can effectively prevent the light from scattering on the outer surface of the manufactured three-dimensional shaped object. As a result, more vivid color representation can be performed.

A three-dimensional shaped object according to the aspect of the invention is characterized in that the three-dimensional shaped object is manufactured by the manufacturing method.

Therefore, the three-dimensional shaped object having a smooth outer surface and a high dimensional accuracy can be provided.

BRIEF DESCRIPTION OF THE DRAWINGS

Referring now to the attached drawings which form a part of this original disclosure.

DETAILED DESCRIPTION OF EXEMPLARY EMBODIMENTS

Hereinafter, a preferred embodiment of the present invention will be described with reference to the attached drawings.

1. Method for Manufacturing Three-Dimensional Shaped Object

First, the method for manufacturing the three-dimensional shaped object of the present invention will be described.

Figure 3A:
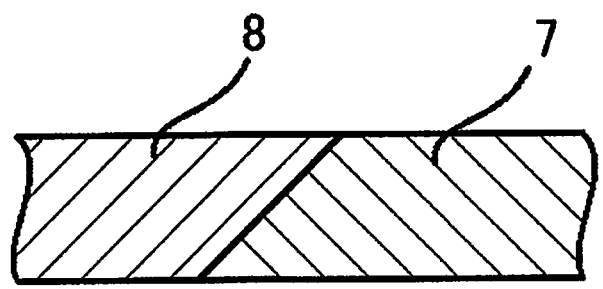
FIGS. 3A and 3B are cross-sectional views showing an example of a boundary between a penetration region of the object formation ink and a penetration region of the sacrificial layer formation ink.
Figure 3B:
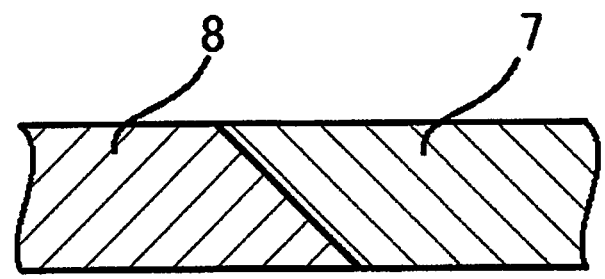

FIGS. 1A-1H are schematic illustrations showing each process in a preferred embodiment of the method for manufacturing the three-dimensional shaped object of the present invention. FIGS. 2A-2D are cross-sectional views schematically showing an example of penetration to layers of an object formation ink and a sacrificial layer formation ink. FIGS. 3A and 3B are cross-sectional views showing an example of a boundary between a penetration region of the object formation ink and the penetration region of the sacrificial layer formation ink.

As shown in FIGS. 1A-1H, the method for manufacturing the present embodiment includes a layer forming process (FIG. 1A, FIG. 1B) forming a layer 6 by using compositions for three-dimensional shaped object including powder for three-dimensional shaped object constituted by a plurality of particles, an ink ejecting process (FIG. 1B, FIG. 1E) ejecting an object formation ink 4A including a curing resin and a sacrificial layer formation ink 4B including a curing resin to the layer 6 by an ink jet method, and a curing process (FIG. 1C, FIG. 1F) forming a unit layer 7 and a sacrificial layer 8 by curing the curing resin included in the object formation ink 4A and the curing resin included in the sacrificial layer formation ink 4B that were applied to the layer 6. These processes are sequentially repeated, and further, the method for manufacturing the present embodiment includes a removing process (FIG. 1H) removing particles, which are not bonded by the curing resin 44 among the particles 63 forming each layer 6, and the sacrificial layer 8.

The object formation ink 4A is ejected to a region to form the three-dimensional shaped object (object) 1. Further, the sacrificial layer formation ink 4B is ejected to a region of the surface side of the outermost layer which is adjacent to the region to become the outermost layer of the three-dimensional shaped object 1.

In the ink ejecting process, the object formation ink 4A and the sacrificial layer formation ink 4B penetrate inside the layers 6 while forming a boundary between the region where the object formation ink 4A penetrates into the layers 6 and the region where the sacrificial layer formation ink 4B penetrates into the layers 6.

In other words, in the ink ejecting process, as shown in FIGS. 2A-2D, the penetration region 7' of the object formation ink 4A and the penetration region 8' of the sacrificial layer formation ink 4B are expanded while forming the boundary surface.

Therefore, it prevents the irregular steps (unevenness) from occurring on the outer surface of the three-dimensional shaped object 1, and the three-dimensional shaped object 1 having high dimensional accuracy and a smooth outer surface can be provided.

Hereinafter, each process will be described.

Layer Forming Process

Figure 1A:
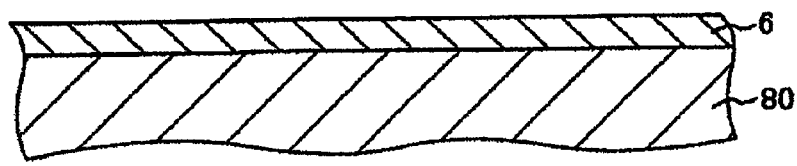
FIGS. 1A-1H are schematic illustrations showing each process according to a preferred embodiment of a method for manufacturing a three-dimensional shaped object of the present invention.

First, the layers 6 are formed on a modeling stage 80 by using the composition for three-dimensional shaped object (FIG. 1A).

Figure 4:
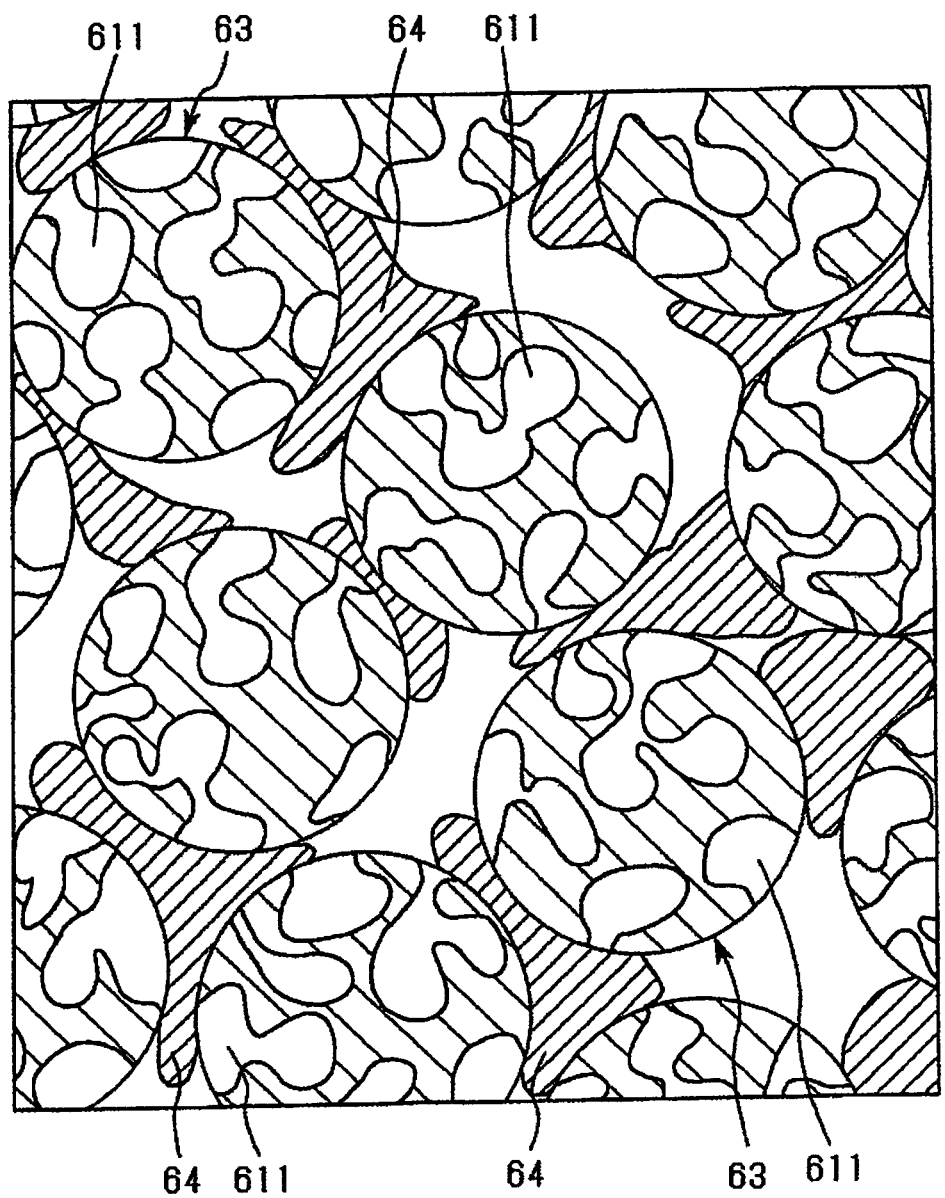
FIG. 4 is a cross-sectional view schematically showing inside of a layer (three-dimensional shaped object composition), which is formed right before an ink application process.

As described later, the composition for three-dimensional shaped object includes a water-soluble resin 64 with a plurality of particles 63. By including the water-soluble resin 64, the particles 63 are bonded to each other (temporarily fixing) (see FIG. 4), and it can effectively prevent the particles from unexpectedly scattering. Therefore, the safety of an operator or the dimensional accuracy of the three-dimensional shaped object 1 to be manufactured can be enhanced.

In this process, it can be performed by using a method such as, for example, a squeegee method, a screen printing method, a doctor blade method, a spin coating method, etc.

A thickness of the formed layers 6 in this process is not limited, but it is preferably equal to or more than 30 μm and equal to or less than 500 μm, and more preferably, equal to or more than 70 μm and equal to or less than 150 μm. Therefore, the productivity of the three-dimensional shaped object 1 is sufficiently excellent, and it can effectively prevent the unevenness from occurring unexpectedly in the manufactured three-dimensional shaped object 1, and the dimensional accuracy of the three-dimensional shaped object 1 can be particularly excellent.

For example, when the composition for three-dimensional shaped object is formed in a solid state (pellet form)(e.g., in a case that the water-soluble resin (thermoplastic resin) 12 in a solid state in an approximate storing temperature (e.g., room temperature (25° C.)) is included and the plurality of particles 63 are bonded by the water-soluble resin), in advance to form the aforementioned layer, it may be possible that the composition for three-dimensional shaped object melts by heating so as to form the composition having fluidity. Therefore, in the aforementioned simple method, the layer formation can be effectively performed, and it can more effectively prevent unexpected unevenness of the thickness of the formed layers 6. As a result, the three-dimensional shaped object 1 having higher dimensional accuracy can be manufactured in high productivity.

Ink Ejecting Process

Figure 1B:
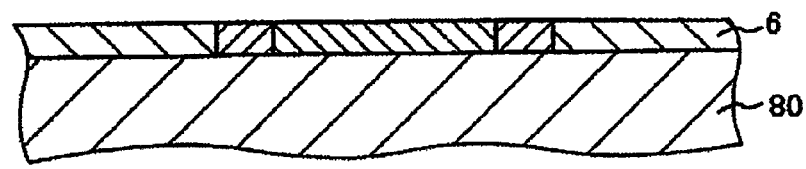

Next, the object formation ink 4A including the curing resin 44 and the sacrificial layer formation ink 4B including the curing resin are applied to the layers 6 by the ink-jet method (FIG. 1B).

In this process, the object formation ink 4A is selectively applied to the part corresponding to the object (material part) of the three-dimensional shaped object 1 in the layers 6, and at approximately the same time, in the layers 6, the sacrificial layer formation ink 4B is selectively applied to the part corresponding to the sacrificial layers. The object formation ink 4A and the sacrificial layer formation ink 4B ejected to the layers 6 at approximately the same time penetrate to the inside of the layers 6 without contacting to the layers 6 at the time of impact. The object formation ink 4A and the sacrificial layer formation ink 4B penetrate in the thickness direction and are contacted to form the boundary between the penetration region 7' of the object formation ink 4A and the penetration region 8' of the sacrificial layer formation ink 4B. The boundary formed by such way becomes the outer surface of the three-dimensional shaped object 1.

Therefore, it can prevent the irregular steps (unevenness) from occurring on the outer surface of the three-dimensional shaped object 1 by penetrating the object formation ink 4A and the sacrificial layer formation ink 4B to the layers 6 while forming the boundary between the penetration region 7' of the object formation ink 4A and the penetration region 8' of the sacrificial layer formation ink 4B. As a result, the three-dimensional shaped object 1 having high dimensional accuracy and the smooth outer surface can be manufactured.

In FIGS. 2A-2D, there is a configuration that an infiltration rate of the object formation ink 4A and the sacrificial layer formation ink 4B to the layers 6 is approximately the same, and therefore, the boundary surface which is approximately parallel to the thickness direction of the layers 6 is formed.

Specifically, in an ink ejecting unit 40 having a X-direction moving unit 42 and a Y-direction moving unit 43 that move a droplet ejection head 41, which will be described later, in a XY plane surface, the infiltration rate can be approximately the same by ejecting the object formation ink 4A and the sacrificial layer formation ink 4B from the droplet ejection head 41 in the same scanning at the time of moving in the X-direction. Further, by ejecting the object formation ink 4A and the sacrificial layer formation ink 4B from the droplet ejection head 41 within 100 milliseconds, the boundary surface can be formed approximately parallel to the thickness direction of the layers 6.

An inclination degree with respect to the thickness direction of the layers 6 of the boundary surface between the penetration region 7' where the object formation ink 4A penetrates into the layers 6 and the penetration region 8' where the sacrificial layer formation ink 4B penetrates into the layers 6 can be adjusted by adjusting the infiltration rate of the object formation ink 4A and the sacrificial layer formation ink 4B to the layers 6.

The adjustment of the infiltration rate can be easily performed by adjusting the ejecting amount of the object formation ink 4A and the sacrificial layer formation ink 4B.

For example, the infiltration rate of the object formation ink 4A can be faster than the infiltration rate of the sacrificial layer formation ink 4B by increasing the ejecting amount of the object formation ink 4A in comparison with the ejecting amount of the sacrificial layer formation ink 4B in a peripheral region that becomes the outer surface of the three-dimensional shaped object 1. As a result, as shown in FIG. 3A, the surface corresponding to the outer surface of the three-dimensional shaped object 1 of the unit layer 7 is inclined toward the outside.

Further, the infiltration rate of the object formation ink 4A can be slower than the infiltration rate of the sacrificial layer formation ink 4B by decreasing the ejecting amount of the object formation ink 4A in comparison with the ejecting amount of the sacrificial layer formation ink 4B in a peripheral region that becomes the outer surface of the three-dimensional shaped object 1. As a result, as shown in FIG. 3B, the surface corresponding to the outer surface of the three-dimensional shaped object 1 of the unit layer 7 is inclined toward the inside.

Further, in this process, as described above, the object formation ink 4A is selectively applied to the part corresponding to the object (material object) of the three-dimensional shaped object 1 in the layers 6.

Figure 5:
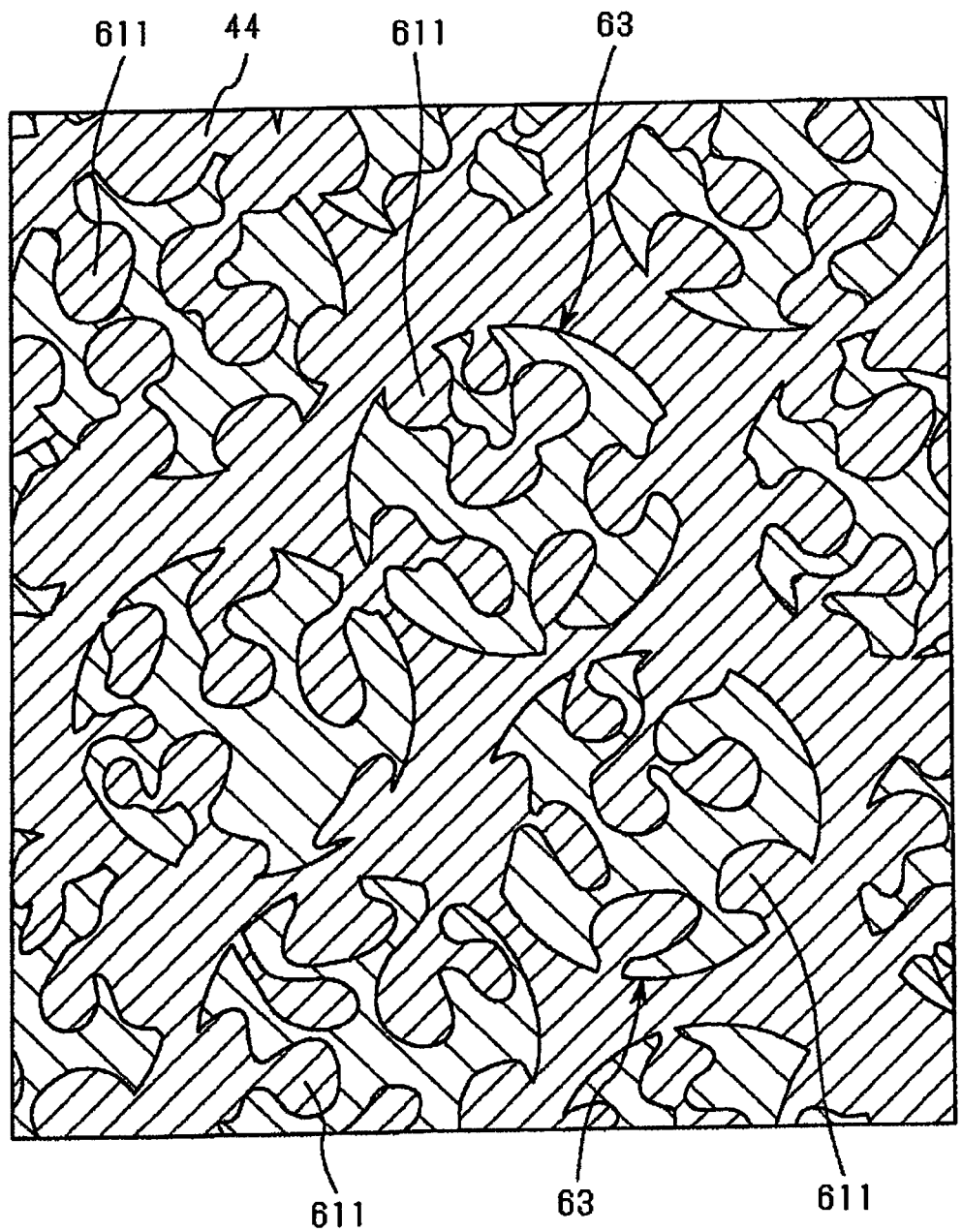
FIG. 5 is a cross-sectional view schematically showing a state in which particles are bonded to each other by a curing resin.

Therefore, the particles 63 configuring the layers 6 can be strongly bonded to each other by the curing resin 44, and the mechanical strength of the finally obtained three-dimensional shaped object 1 can be excellent. Also, when the composition for the three-dimensional shaped object configuring the layers 6 includes a plurality of porous particles 63, the curing resin 44 gets into the holes 611 of the particles 63 so as to demonstrate the anchor effect, and as a result, the bonding force for bonding the particles 63 to each other (bonding force through the curing resin 44) can be excellent. Also, the mechanical strength of the finally obtained three-dimensional shaped object 1 can be excellent (see FIG. 5). Further, by getting the curing resin 44, which is included in the object formation ink 4A and is applied in this process, into the holes 611 of the particles 63, the unexpected wet spreading of the ink can be effectively prevented. As a result, the finally obtained three-dimensional shaped object 1 can be provided with higher dimensional accuracy.

In this process, even if the application pattern of the object formation ink 4A and the sacrificial layer formation ink 4B is a fine shape, the object formation ink 4A and the sacrificial layer formation ink 4B can be applied with excellent reproducibility because the object formation ink 4A and the sacrificial layer formation ink 4B are applied by the ink-jet method. As a result, the finally obtained three-dimensional shaped object 1 can be provided with particularly higher dimensional accuracy.

The object formation ink 4A and the sacrificial layer formation ink 4B will be described later.

Curing Process (Unit Layer Forming Process)

Figure 1C:
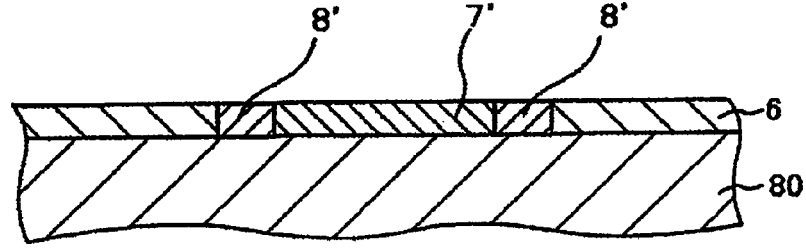
Figure 1D:
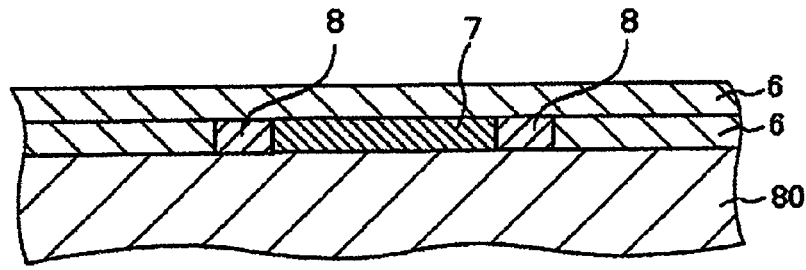

After that, the curing component included in the object formation ink 4A and the sacrificial layer formation ink 4B ejected to the layers 6 is cured (FIG. 1C, FIG. 1D). Therefore, the unit layers 7 and the sacrificial layers 8 are obtained. Accordingly, the bonding strength between the curing resin 44 and the particles 63 can be particularly excellent, and as a result, the mechanical strength of the finally obtained three-dimensional shaped object 1 can be particularly excellent.

In this process, depending on the type of the curing component (curing resin), for example, when the curing component (curing resin) is a thermal curing resin, it can be performed by heating. When the curing component (curing resin) is a light curable resin, it can be performed by emitting the corresponding light (for example, when the curing component is an ultraviolet curable resin, it can be performed by emitting ultraviolet light).

The ink ejecting process and the curing process may be performed nearly simultaneously. That is, before the entire pattern of one entire layer 6 is formed, the curing reaction may be sequentially progressed from the part where each ink was applied.

Figure 1E:
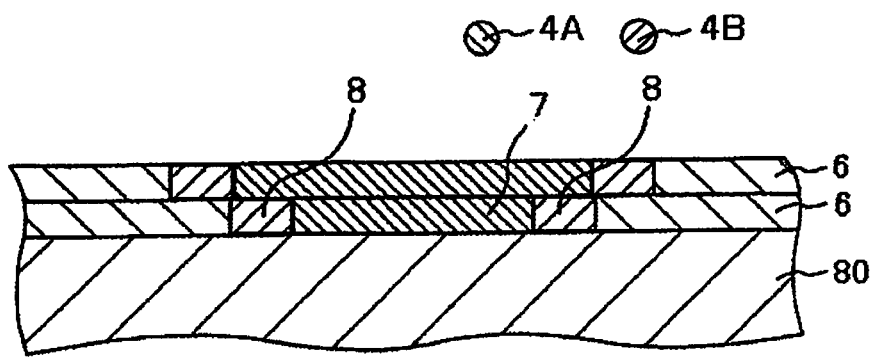
Figure 1F:
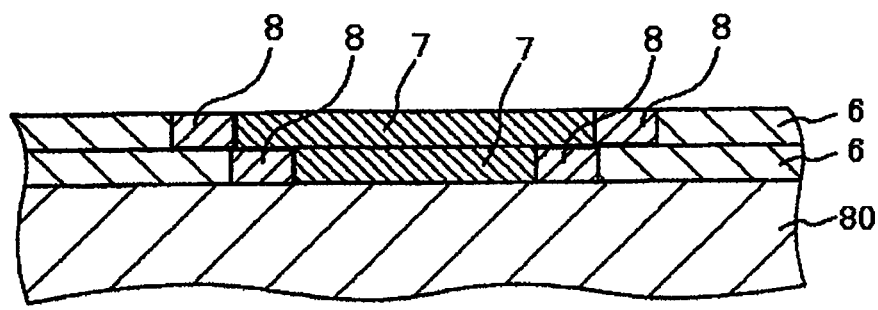
Figure 1G:
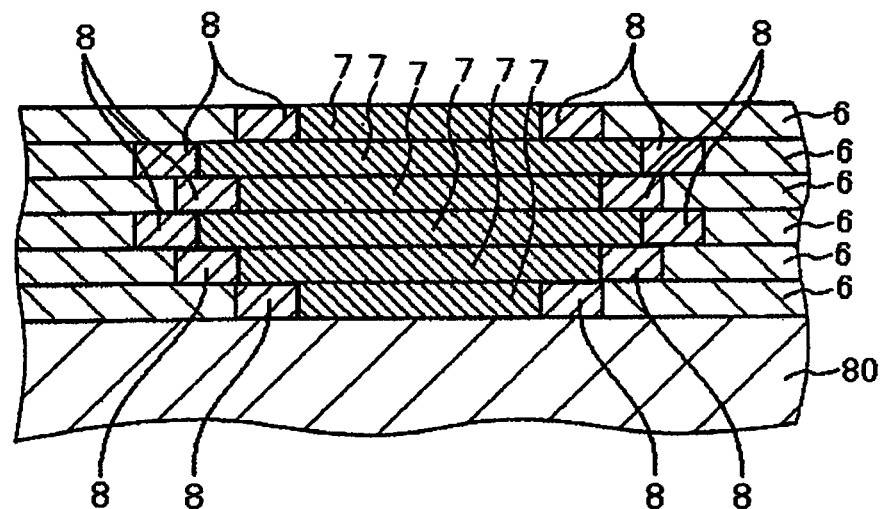
Figure 1H:
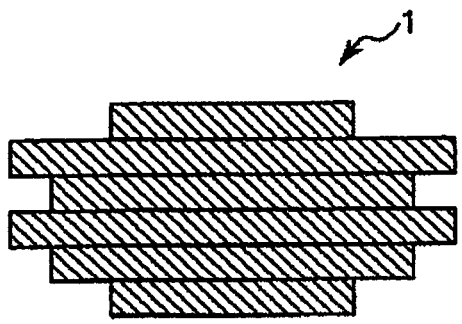
Figure 2A:
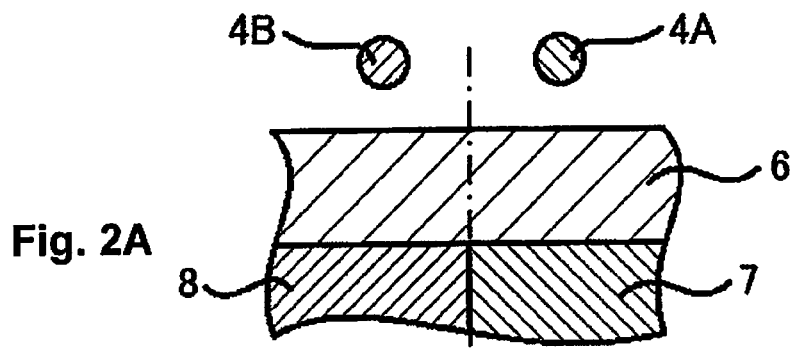
FIGS. 2A-2D are cross-sectional views schematically showing an example of penetration to layers of an object formation ink and a sacrificial layer formation ink.
Figure 2B:
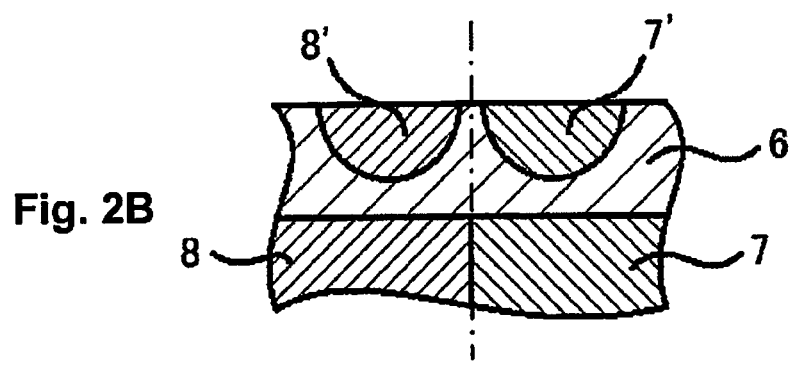
Figure 2C:
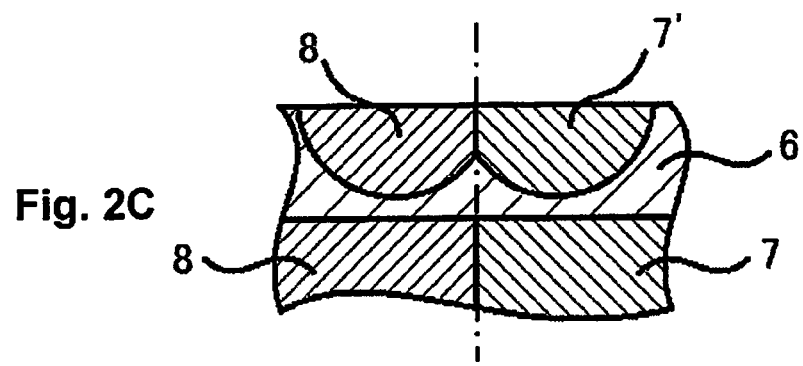
Figure 2D:
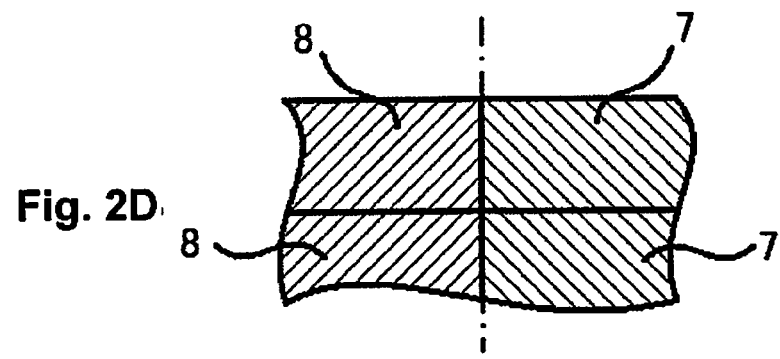

After that, the set of the aforementioned processes is repeatedly performed (see FIGS. 1D, 1E, and 1F). Therefore, it becomes a state in which the particles 63 in the part where the object formation ink 4A and the sacrificial layer formation ink 4B were applied are bonded, and therefore, the laminated body in which the plurality of layers 6 in such state are laminated (see FIG. 1G).

Further, each ink applied to the layers 6 in the second or later ink ejecting process (see FIG. 1D) is used for bonding the particles 63, which configure the layers 6, to each other, and a part of the applied each ink penetrates into the layers 6 lower than that. Therefore, each ink is not only used for bonding the particles 63 to each other in each layer 6, but it is used for bonding the particles 63 between the adjacent layers. As a result, the finally obtained three-dimensional shaped object 1 has excellent mechanical strength as a whole.

Sacrificial Layer Removing Process

After repeating one set of the aforementioned processes, as a post-treatment process, a sacrificial layer removing process (FIG. 1H) for removing the curing resin 44 which is not bonded (unattached particles) among the particles 63 constituting each layer 6 and the sacrificial layer 8 is performed. Therefore, the three-dimensional shaped object 1 is obtained.

A method for removing the unattached particles includes, for example, a method for moving the unattached particles by a brush, etc., a method for removing the unattached particles by suction, a method for removing the unattached particles by blowing air, a method for removing the unattached particles by applying liquid such as water, etc. (e.g., a method for immersing the aforementioned obtained laminated body in the liquid, a method for blowing liquid, etc.), and a method for removing the unattached particles by applying vibration such as an ultrasonic vibration, etc. Also, it may be possible to combine two or more methods selected from the aforementioned methods.

A method for removing the sacrificial layers 8 includes, for example, a method for selectively dissolving and removing the sacrificial layers 8 by using liquid which selectively dissolves the sacrificial layers 8, and a method for separating or breaking the sacrificial layers 8 after swelling the sacrificial layers 8 or reducing the mechanical strength of the sacrificial layers 8 by selectively suctioning the liquid in the sacrificial layers 8 by using the liquid having high absorbability of the sacrificial layers 8 in comparison with the unit layer 7, etc.

As the liquid used in this process, depending on the constituent material, etc. of the unit layers 7 and the sacrificial layers 8, for example, water, alcohols such as methanol, ethanol, isopropyl alcohol, etc., and glycols such as glycerin, ethylene glycol, diethylene glycol, triethylene glycol, propylene glycol, dipropylene glycol, etc. can be used, and it includes one or more materials selected from these aforementioned materials. A water-soluble substance generating hydroxide ion such as sodium hydroxide, potassium hydroxide, sodium hydrogen carbonate, organic amine, etc., and a surfactant that easily separates the sacrificial layer may be mixed.

A method for applying the liquid is not particularly limited. For example, a dipping method, a spray method (spraying method), coating method, various printing methods, etc. can be employed.

Also, in the aforementioned description, the liquid was used, but it may use substances (e.g., solid, gas, supercritical fluid, etc.) having the same function.

Further, at the time of applying the aforementioned liquid or after the aforementioned liquid was applied, the ultrasonic vibration may be applied. Therefore, removing the sacrificial layers 8 can be enhanced, and the productivity of the three-dimensional shaped object 1 can be particularly excellent.

2. Three-Dimensional Shaped Object Manufacturing Device

Next, a three-dimensional shaped object manufacturing device 100 according to the present embodiment will be described.

Figure 6:
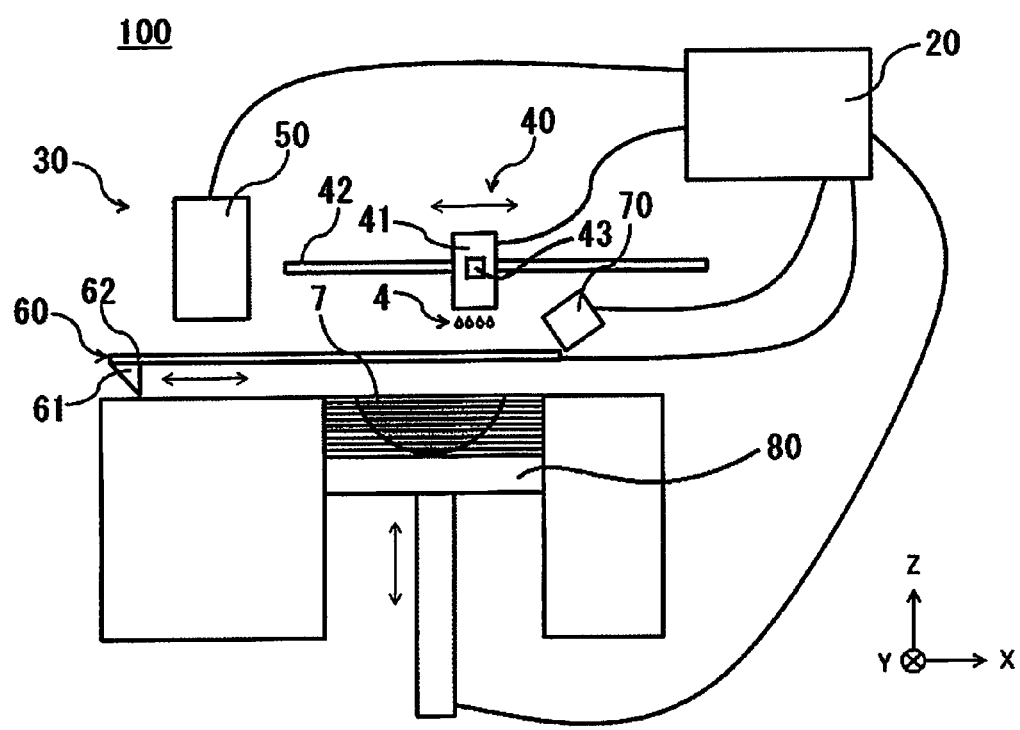
FIG. 6 is a schematic illustration showing a three-dimensional shaped object manufacturing device for manufacturing the three-dimensional shaped object.
Figure 7:
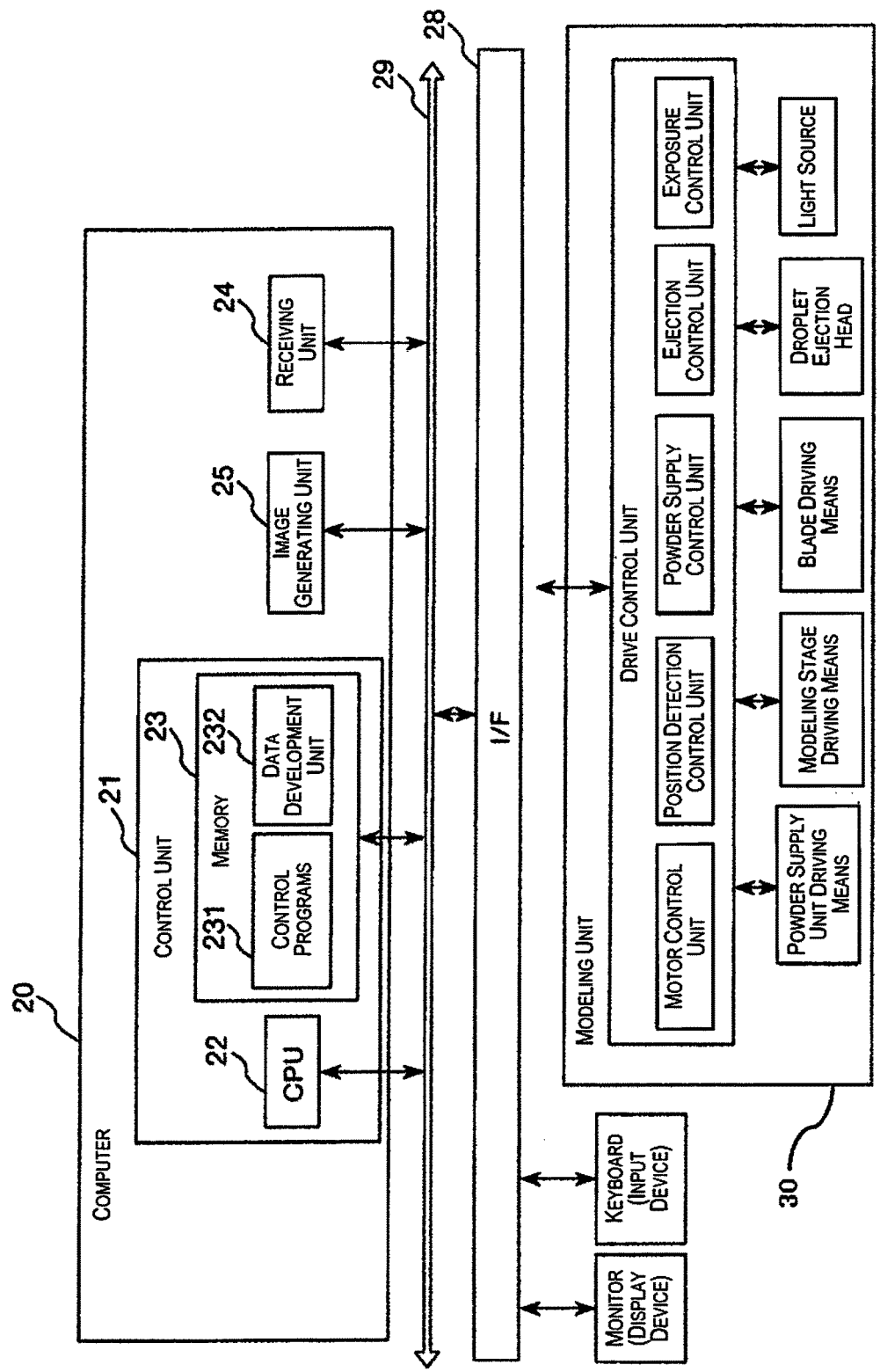
FIG. 7 is a block diagram of a control unit provided in the three-dimensional shaped object manufacturing device as shown in FIG. 6.

FIG. 6 is a schematic illustration showing the three-dimensional shaped object manufacturing device that manufactures a three-dimensional shaped object. FIG. 7 is a block diagram of a control unit provided in the three-dimensional shaped object manufacturing device shown in FIG. 6.

The three-dimensional shaped object manufacturing device 100 is the device used for the aforementioned method for manufacturing the three-dimensional shaped object. The device forms the three-dimensional shaped object 1 by generating the model of the unit layers 7, sequentially forming each unit layer 7 based on the model, and sequentially laminating each unit layer 7.

As shown in FIG. 6 and FIG. 7, the three-dimensional shaped object manufacturing device 100 is provided with a computer 20 that performs the generation of the model of the unit layers 7, and a modeling unit 30 that forms the three-dimensional shaped object 1.

Hereinafter, each unit configuring the three-dimensional shaped object manufacturing device 100 will be described in detail.

Modeling Unit 30

As show in FIG. 6, the modeling unit 30 is provided with an ink ejecting unit (ink ejecting means) 40, a powder supply unit 50, a powder control unit 60, a light source 70, and a modeling stage 80, and they are electronically connected to the computer 20.

The ink ejecting unit 40 is provided with a droplet ejection head 41 that ejects droplets of the object formation ink 4A and the sacrificial layer formation ink 4B by the ink-jet method. Also, the ink ejecting unit 40 is provided with an ink supply unit which is not shown in the drawing. In the present embodiment, the droplet ejection head 41 of a so-called piezo drive system is employed. The droplet ejection head 41 has a configuration in which the ejecting amount of the object formation ink 4A and the sacrificial layer formation ink 4B is changed in accordance with an instruction of the control unit 21 which will be described later.

Further, the ink ejecting unit 40 is provided with an X-direction moving unit 42 and a Y-direction moving unit 43 that move the droplet ejection head 41 on the XY plane surface.

The powder supply unit 50 has the function to supply the powder for three-dimensional shaped object (hereinafter simply referred to as powder) to the modeling stage 80 which will be described later. The powder supply unit 50 is configured to be driven by a powder supply part driving means which is not shown in the drawing.

The powder control unit 60 is provided with a blade 61 and a guide rail 62 that guides the movement of the blade 61. The powder control unit 60 controls the composition for three-dimensional shaped object supplied from the powder supply unit 50 by the blade 61, and has the function to form the layers 6 configured by the composition for three-dimensional shaped object on the modeling stage 80.

The long blade 61 is elongated in the Y-direction, and the lower tip has acicular blade shape. The blade 61 is driven in the X-direction along the guide rail 62 by the blade driving means which is not shown in the drawing.

A layer formation means is configured by the powder supply unit 50 and the powder control unit 60.

The light source 70 has the function to cure the object formation ink 4A and the sacrificial layer formation ink 4B applied to the layers 6 of the three-dimensional shaped object composition formed by the powder control unit.

The light source 70 is configured to emit the ultraviolet light. As the light source 70, for example, a mercury lamp, a metal halide lamp, a xenon lamp, an excimer lamp, etc. can be employed.

The shape of the modeling stage 80 is a rectangle-shape on the XY cross-section surface. The unit layers 7 are formed on the modeling stage 80 by bonding the powders by the object formation ink 4A and the sacrificial layer formation ink 4B.

The modeling stage 80 is capable of moving in the Z-direction by a modeling stage driving means which is not shown in the drawing.

The modeling stage 80 is moved by the thickness of the layer 6 to be formed, and the layer 6 is formed by the powder supply unit 50 and the powder control unit 60.

Further, the modeling unit 30 is provided with a drive control unit which is not shown.

The drive control unit is provided with a motor control unit, a position detection control unit, a powder supply control unit, an ejection control unit, and an exposure control unit.

The motor control unit individually controls the driving of the droplet ejection head 41 in the XY-direction, the driving of the blade 61, and the driving of the modeling stage 80 based on an instruction from the CPU of the computer 20 which will be described later.

The position detection control unit individually controls a position of the droplet ejection head 41, a position of the blade 61, and a position of the modeling stage 80 based on an instruction from the CPU.

The powder supply control unit controls the driving (supplying powder) of the powder supply unit 50 based on an instruction from the CPU.

The ejection control unit controls the driving (ejecting droplets) of the droplet ejection head 41 based on an instruction from the CPU.

The exposure control unit controls a state of an emission of the light source 70 based on an instruction from the CPU.

Computer 20

As shown in FIG. 7, the computer 20 is provided with a control unit 21 that controls operations of each unit of the modeling unit 30, a receiving unit 24, and an image generating unit 25.

The control unit 21 is provided with the Central Processing Unit (CPU) 22, and a memory 23.

The CPU 22 performs various arithmetic processes as a processor and executes the control program 231.

The memory 23 is provided with a Read Only Memory (ROM), a Random Access Memory (RAM), etc. In the memory 23, a region storing control programs 231 that disclose the control procedures of the operations in the modeling unit 30, a data development unit 232 as a region which temporarily developing various data, etc. are set. The memory 23 is connected to the CPU 22 through the data bus 29.

Also, the image generating unit 25 and the receiving unit 24 are connected to the control unit 21 through a data bus 29. Further, the drive control unit of the modeling unit 30 is connected to the control unit 21 through an I/O interface 28 and the data bus 29. Further, the aforementioned powder supply part driving means, the aforementioned modeling stage driving means, the aforementioned blade driving means, the aforementioned droplet ejection head and the aforementioned light source are connected to the drive control unit through the I/O interface 28 and the data bus 29.

The image generating unit 25 has the function to produce a model of the three-dimensional shaped object 1, etc. The image generating unit 25 is configured by software, etc. that generates a three-dimensional object of a three-dimensional Computer-Aided Design (CAD).

The image generating unit 25 has the three-dimensional shaped object model generation function that generates a model of the three-dimensional shaped object 1 or it has the function to generate the outer surface, etc. of the model of the three-dimensional shaped object 1 such as Standard Triangukated Language (STL), etc. in a two-dimensional model that presents a two-dimensional mode of polygonal shape, etc. such as a triangle-shape or quadrangle-shape. That is, the image generating unit 25 has the function to generate the three-dimensional shape data of the three-dimensional shaped object 1.

Further, the image generating unit 25 has the function to generate a model of the unit layers 7 by cutting the model of the three-dimensional shaped object 1 in layers. Also, it has the function to generate sacrificial layer data based on the unit layer data.

The unit layer data and the sacrificial layer data generated in the image generating unit 25 are stored in the memory 23 and are transmitted to the drive control unit of the modeling unit 30 through the I/O interface 28 and the data bus 29. The modeling unit 30 is driven based on the transmitted unit layer data and the sacrificial layer data.

The receiving unit 24 is provided with a Universal Serial BUS (USB) port, a LAN port, etc. The receiving unit 24 has the function to receive an original object for generating a model of the three-dimensional shaped object 1 from an external device, etc. (not shown) such as a scanner, etc.

Further, a monitor (display device) or a keyboard (input device) is connected to the computer 20 (not shown). Each of the monitor and the keyboard is connected to the control unit 21 through the I/O interface and the data bus.

The monitor has the function to display an image file obtained in the receiving unit 24 in an image display region. By providing the monitor, the operator can visually understand the image file, etc.

As the input device, it is not limited to the keyboard, but it may be a mouse, a trackball, a touch panel, etc.

In the aforementioned three-dimensional shaped object manufacturing device 100, first, the unit layer data and the sacrificial layer data are generated based on the three-dimensional shape data. The layers 6 of the powder for three-dimensional shaped object (the composition for three-dimensional shaped object that includes the powder for three-dimensional shaped object) are formed on the modeling stage 80 based on the unit layer data and the sacrificial layer data. Further, the unit layers 7 and the sacrificial layers 8 are formed by applying the object formation ink 4A and the sacrificial layer formation ink 4B. The formed unit layer 7 and the sacrificial layer 8 are sequentially laminated multiple times so as to obtain the three-dimensional shaped object 1.

3. Ink-Set (Object Formation Ink 4A and Sacrificial Layer Formation Ink 4B)

Next, an ink-set will be described.

The ink-set of the present embodiment is provided with at least one type of the object formation ink 4A and the sacrificial layer formation ink 4B. The ink-set of the present embodiment is applied to the aforementioned method for manufacturing the three-dimensional shaped object and the aforementioned three-dimensional shaped object manufacturing device of the present invention.

Object Formation Ink

The object formation ink 4A includes at least curing resin 44 (curing component).

Curing Resin 44

As the curing resin (curing component), for example, the followings are exemplified: a thermosetting resin; various light curable resins such as visible light curable resin (narrowly-defined light curable resin) that is cured by the light in a visible resin, an ultraviolet curable resin, an infrared curable resin, etc.; a X-ray curable resin, etc. It may be used by combining one or more resins selected from these curing resins.

Among these resins, from the viewpoint of the mechanical strength of the obtained three-dimensional shaped object 1, the productivity of the three-dimensional shaped object 1, the preservation stability of the object formation ink 4A, etc., the ultraviolet curable resin (polymerizable compound) is particularly preferred.

As the ultraviolet curable resin (polymerizable compound), it is preferable to use the resin producing a polymer by starting addition-polymerization or ring-opening polymerization by radical species or cationic species produced from the photopolymerization initiator by emitting the ultraviolet light. As a polymerization method of the addition-polymerization, the followings are exemplified: radical, cation, anion, metathesis, and coordination polymerization. Further, as a polymerization method of the ring-opening polymerization, the followings are exemplified: cation, anion, radical, metathesis, and coordination polymerization.

As the addition-polymerizable compound, for example, the followings are exemplified: the compounds having at least one ethylenically unsaturated double bond, etc. As the addition-polymerizable compound, it can preferably use the compound having at least one thermal ethylenically unsaturated bond, and more preferably two or more terminal ethylenically unsaturated bonds.

The ethylenically unsaturated polymerizable compound has a chemical formation of monofunctional polymerizable compound and multifunctional polymerizable compound or the mixture of these compounds.

As the monofunctional polymerizable compound, for example, the followings are exemplified: unsaturated carboxylic acid (e.g., acrylic acid, methacrylic acid, itaconic acid, crotonic acid, isocrotonic acid, maleic acid, etc.), or their esters, amides, etc.

As the multifunctional polymerizable compound, esters of unsaturated carboxylic acid and aliphatic polyhydric alcohol compound, amides of unsaturated carboxylic acid and aliphatic amine compound are used.

Further, unsaturated carboxylic ester having nucleophilic substituent such as hydroxyl group, amino group, mercapto group, etc., addition reaction product of amides and isocyanates, epoxies, and dehydration condensation reaction product of carboxylic acid, etc. can be used. Also, unsaturated carboxylic ester having electrophilic substituent such as isocyanate group, epoxy group, etc., or addition reaction product of amides, alcohols, amines, and thiols, and in addition, unsaturated carboxylic ester having leaving substituent such as halogen group, tosyloxy group, etc. or substitution reaction product of amides, alcohols, amines, and thiols can be used.

As a specific example of radical polymerizable compound which is esters of unsaturated carboxylic acid and aliphatic polyhydric alcohol compound, for example, (meth)acrylic acid ester is typical, and any of monofunctional compound or multifunctional compound can be used.

As a specific example of monofunctional(meth)acrylate, for example, the followings are exemplified: tolyloxyethyl (meth)acrylate, phenyloxyethyl(meth)acrylate, cyclohexyl (meth)acrylate, ethyl(meth)acrylate, methyl(meth)acrylate, isobornyl(meth)acrylate, dipropylene glycol di(meth)acrylate, tetrahydrofurfuryl(meth)acrylate, ethoxyethoxyethyl (meth)acrylate, (meth)acrylicacid2-(2-vinyloxyethoxy) ethyl, 2-hydroxy-3-phenoxypropyl(meth)acrylate, 4-hydroxybutyl(meth)acrylate, etc.

As a specific example of bifunctional (meth)acrylate, for example, the followings are exemplified: ethylene glycol di(meth)acrylate, triethylene glycol di(meth)acrylate, 1,3-butanediol di(meth)acrylate, tetramethylene glycol di(meth) acrylate, propylene glycol di(meth)acrylate, neopentyl glycol di(meth)acrylate, hexanediol di(meth)acrylate, 1,4-cyclohexanediol di(meth)acrylate, tetraethylene glycol di(meth)acrylate, pentaerythritol di(meth)acrylate, dipentaerythritol di(meth)acrylate, etc.

As a specific example of trifunctional (meth)acrylate, for example, the followings are exemplified: trimethylolpropane tri(meth)acrylate, trimethylol ethane tri(meth)acrylate, alkylene oxide-modified tri(meth)acrylate of trimethylolpropane, pentaerythritol tri(meth)acrylate, dipentaerythritol tri (meth)acrylate, trimethylol propane tri((meth)acryloyloxypropyl)ether, isocyanuric acid alkylene oxide-modified tri (meth)acrylate, propionic acid dipentaerythritol tri(meth) acrylate, tri((meth) acryloyloxyethyl)isocyanurate, hydroxypivalaldehyde-modified dimethylol propane tri (meth)acrylate, sorbitol tri(meth)acrylate, etc.

As a specific example of tetrafunctional (meth)acrylate, for example, the followings are exemplified: pentaerythritol tetra(meth)acrylate, sorbitol tetra(meth)acrylate, ditrimethylolpropane tetra(meth)acrylate, propionic acid dipentaerythritol tetra(meth)acrylate, ethoxylated pentaerythritoltetra(meth)acrylate, etc.

As a specific example of pentafunctional (meth)acrylate, for example, the followings are exemplified: sorbitol penta (meth)acrylate, dipentaerythritol penta(meth)acrylate, etc.

As a specific example of hexafunctional (meth)acrylate, for example, the followings are exemplified: dipentaerythritol hexa(meth)acrylate, sorbitol hexa(meth)acrylate, alkylene oxide-modified hexa(meth)acrylate of phosphazene, caprolactone-modified dipentaerythritol hexa(meth)acrylate, etc.

As a specific example of polymerizable compound other than (meth)acrylate, for example, the followings are exemplified: itaconic acid ester, crotonic acid ester, isocrotonic acid ester, maleic acid ester, etc.

As itaconic acid ester, for example, the followings are exemplified: ethylene glycol diitaconate, propylene glycol diitaconate, 1,3-butane diol diitaconate, 1,4-butane diol diitaconate, tetramethylene glycol diitaconate, pentaerythritol diitaconate, sorbitol tetraitaconate, etc.

As crotonic acid ester, for example, the followings are exemplified: ethylene glycol dicrotonate, tetramethylene glycol dicrotonate, pentaerythritol dicrotonate, sorbitol tetra dicrotonate, etc.

As isocrotonic acid ester, for example, the followings are exemplified: ethylene glycol diisocrotonate, pentaerythritol diisocrotonate, sorbitol tetraisocrotonate, etc.

As maleic acid ester, for example, the followings are exemplified: ethylene glycol dimaleate, triethylene glycol dimaleate, pentaerythritol dimaleate, sorbitol tetra malate, etc.

As an example of other esters, aliphatic alcohol esters as disclosed in Japanese Examined Patent Publication No. 46-27926, Japanese Examined Patent Publication No. 51-47334, and Japanese Laid-open Patent Application Publication No. 57-196231, esters having aromatic skeleton as disclosed in Japanese Laid-open Patent Application Publication No. 59-5240, Japanese Laid-open Patent Application Publication No. 59-5241, and Japanese Laid-open Patent Application Publication No. 2-226149, esters including amino group as disclosed in Japanese Laid-open Patent Application Publication No. 1-165613, etc. can be used.

Further, as a specific example of amino monomer of unsaturated carboxylic acid and aliphatic amine compound, the followings are exemplified: methylenebis-acrylamide, methylenebis-methacrylamide, 1,6-hexamethylenebis-acrylamide, 1,6-hexamethylenebis-methacrylamide, diethylenetriamine tris acrylamide, xylylenebis-acrylamide, xylylenebis-methacrylamide, (meth)acryloyl morpholine, etc.

As other preferable amide-based monomers, for example, the following is exemplified: amid-based monomer having a cyclohexylene structure as described in Japanese Examined Patent Publication No. 54-21726.

Further, urethane-based addition polymerizable compounds produced by using addition reaction between isocyanate and hydroxyl group is also preferred, and as a specific example of such compound, in polyisocyanate compound having two or more isocyanate groups in a molecule described in Japanese Examined Patent Publication No. 48-41708, it includes vinyl urethane compound including two or more polymerizable vinyl groups in which vinyl monomer including hydroxyl group shown in the following formula (1) is added, etc.

$$CH_2=C(R^1)COOCH_2CH(R^2)OH \qquad (1)$$

(In formula (1), $R^1$ and $R^2$ individually represent H or $CH^3$.)

In the present embodiment, it is preferable that cationic ring-opening polymerization compound having one or more cyclic ether group such as epoxy group, oxetane group, etc. in a molecule can be used as the ultraviolet curable resin (polymerizable compound).

As the cationic polymerization compound, for example, the followings are exemplified: curable compounds including ring-opening polymerization group, and among these compounds, heterocyclic group-containing curable compound is particularly preferred. As such curable compound, for example, the followings are exemplified: cyclic imino ethers such as epoxy derivative, oxetane derivative, tetrahydrofuran derivative, cyclic lactone derivative, cyclic carbonate derivative, oxazoline derivative, etc., vinyl ethers, etc., and among these compounds, epoxy derivative, oxetane derivative, and vinyl ethers are preferred.

As an example of preferred epoxy derivative, the followings are exemplified: monofunctional glycidyl ethers, multifunctional glycidyl ethers, monofunctional alicyclic epoxies, polyfunctional alicyclic epoxies, etc.

As an example of specific compounds of glycidyl ethers, for example, the followings are exemplified: diglycidyl ethers (e.g., ethylene glycol diglycidyl ether, bisphenol A diglycidyl ether, etc.), more than trifunctional glycidyl ethers (e.g., trimethylol ethane triglycidyl ether, trimethylol propane triglycidyl ether, glycerol triglycidyl ether, triglycidyl tris-hydroxyethyl isocyanurate, etc.), more than tetrafunctional glycidyl ethers (e.g., sorbitol tetraglycidyl ether, pentaerythritol tetraglycyl ether, poly-glycidyl ether of cresol novolac resin, poly-glycidyl ether of phenol novolac resin, etc.), alicyclic epoxies (e.g., CELLOXIDE 2021P, CELLOXIDE 2081, EPOLEAD GT-301, EPOLEAD GT-401 (the aforementioned compounds made by Daicel Chemical Industries, Ltd.), EHPE (Daicel Chemical Industries, Ltd.), polycyclohexyl epoxy methyl ether of phenol novolac resin, etc.), oxetanes (e.g., QX-SQ, PNOX-1009 (the aforementioned compounds made by Toagosei Co., LTD.), etc.

As the polymerizable compounds, it is preferable to use alicyclic epoxy derivative. The phrase "alicyclic epoxy group" can be said the partial structure where the double bond of cycloalkenes ring such as cyclopentene group, cyclohexene group, etc. is epoxidized by an appropriate oxidant such as hydrogen peroxide, peracide, etc.

As the alicyclic epoxy compounds, polyfunctional alicyclic epoxy having two or more cyclohexene oxide groups or cyclopentene oxide groups in a molecule is preferred. As a specific example of the alicyclic epoxy compounds, for example, the followings are exemplified: 4-vinyl cyclohexene dioxide, (3,4-epoxy cyclohexyl)methyl-3,4-epoxycyclohexylcarboxylate, di(3,4-epoxycyclohexyl)adipate, di(3,4-epoxycyclohexylmethyl)adipate, bis(2,3-epoxy cyclopentyl) ether, di(2,3-epoxy-6-methylcyclohexylmethyl)adipate, dicyclopentadiene dioxide, etc.

A glycidyl compound having normal epoxy group, which does not have alicyclic structure, in a molecule can be individually used or can be used with the aforementioned alicyclic epoxy compounds.

As such normal glycidyl compound, for example, the followings are exemplified: glycidyl ether compound, glycidyl ester compound, etc. The glycidyl ether compound is preferably used.

As a specific example of the glycidyl ether compounds, for example, the followings are exemplified: aromatic glycidyl ether compounds such as 1,3-bis(2,3-epoxypropyloxy)benzene, bisphenol A type epoxy resin, bisphenol F type epoxy resin, phenol novolac type epoxy resin, cresol novolac type epoxy resin, trisphenolmethane type epoxy resin, etc., aliphatic glycidyl ether compounds such as 1,4-butanediol glycidyl ether, glycerol triglycidyl ether, propylene glycol diglycidyl ether, trimethylolpropane tritriacontanoic glycidyl ether, etc. As the glycidyl esters, for example, the followings are exemplified: glycidyl esters of linolenic acid dimer, etc.

As the polymerizable compounds, the compound having oxetanyl group which is four-membered cyclic ether (hereinafter referred to as "oxetane compound") can be used. The compound including oxetanyl group is the compound having one or more oxetanyl group in a molecule.

Among the aforementioned curing components, specifically, the object formation ink 4A preferably includes one or more elements selected from the group composed of (meth)acrylic acid 2-(2-vinyloxyethoxy)ethyl, polyether-based aliphatic urethane(meth)acrylate oligomer, 2-hydroxy-3-phenoxypropyl(meth)acrylate, and 4-hydroxybutyl(meth)acrylate. Therefore, the object formation ink 4A can be cured in more appropriate curing rate, and the productivity of the three-dimensional shaped object 1 can be particularly excellent.

Further, strength, durability, reliability of the three-dimensional shaped object 1 can be particularly excellent.

Further, by including these curing components, resolvability and swellability for various solvents (e.g., water, etc.) of curing material of the object formation ink 4A can be particularly reduced. As a result, in the sacrificial layer removing process, the sacrificial layers 8 can be more surely removed in high selectivity, and it can prevent unexpected deformation caused by the defect from occurring in the three-dimensional shaped object 1. As a result, the dimensional accuracy of the three-dimensional shaped object 1 can be more securely enhanced.

Further, the swellability (absorbent of solvent) of the curing material of the object formation ink 4A can be reduced so that for example, a drying process as a processing after the sacrificial layer removing process can be omitted or simplified. Also, the solvent resistance of the finally obtained three-dimensional shaped object 1 is improved so that the reliability of the three-dimensional shaped object 1 is enhanced.

Specifically, when the object formation ink 4A includes (meth)acrylic acid 2-(2-vinyloxyethoxy)ethyl, the oxygen inhibition hardly influences so that it is possible to cure in low energy, and also, the copolymer including other monomer progresses so that the effect for enhancing the strength of the object is obtained.

Further, when the object formation ink 4A includes polyether-based aliphatic urethane (meth)acrylate oligomer, the effect for increasing both strength and toughness of the object can be obtained.

Further, when the object formation ink 4A includes 2-hydroxy-3-phenoxypropyl(meth)acrylate, it has flexibility so that the effect for improving the breaking elongation can be obtained.

Further, when the object formation ink 4A includes 4-hydroxybutyl(meth)acrylate, the effect for enhancing the strength of the object is obtained by improving the adhesiveness to PMMA, PEMA particles or silica particles, metal particles, etc.

When the object formation ink 4A includes the aforementioned specific curing components (one or two selected from the group composed of (meth)acrylic acid 2-(2-vinyloxyethoxy)ethyl, polyether-based aliphatic urethane(meth)acrylate oligomer, 2-hydroxy-3-phenoxypropyl(meth)acrylate, and 4-hydroxybutyl(meth)acrylate), the ratio of the specific curing components for all curing components constituting the object formation ink 4A is preferably equal to or more than 80 mass %, more preferably equal to or more than 90 mass %, and further preferably 100%. Therefore, the aforementioned effects are remarkably demonstrated.

The content rate of the curing components in the object formation ink 4A is preferably equal to or more than 80 mass % and equal to or less than 97 mass %, and more preferably, equal to or more than 85 mass % and equal to or less than 95 mass %.

Therefore, the mechanical strength of the finally obtained three-dimensional shaped object 1 can be particularly excellent. Further, the productivity of the three-dimensional shaped object 1 can be particularly excellent.

Also, when the refractive index of the particles 63 forming the power for three-dimensional shaped object is denoted as n1, and when the refractive index of the curing material of the curing resin included in the object formation ink 4A is denoted as n2, it preferably satisfies the relationship of $|n1-n2| \leq 0.2$, and more preferably satisfies the relationship of $|n1-n2| \leq 0.1$. Therefore, it can effectively prevent the light from scattering on the outer surface of the manufactured three-dimensional shaped object 1. As a result, more vivid color representation can be performed.

Polymerization Initiator

Also, the object formation ink 4A preferably includes a polymerization initiator.

Therefore, the curing rate of the object formation ink 4A at the time of manufacturing the three-dimensional shaped object 1 can be improved, and the productivity of the three-dimensional shaped object 1 can be particularly excellent.

As a polymerization initiator, for example, the followings are exemplified: a photo-radical polymerization initiator (aromatic ketones, acyl phosphine oxide compound, aromatic onium salt compound, organic peroxide, thio compound (thioxanthone compound, thiophenyl group-containing compound, etc.), hexaarylbiimidazole compound, ketoxime ester compound, borate compound, azinium compound, metallocene compound, active ester compound, a compound having a carbon-halogen bond, alkyl amine compound, etc.), a photo-cationic polymerization initiator, etc., and specifically, the followings are exemplified: acetophenone, acetophenone benzyl ketal, 1-hydroxy cyclohexyl phenyl ketone, 2,2-dimethoxy-2-phenyl acetophenone, xanthone, fluorenone, benzaldehyde, fluorine, anthraquinone, triphenylamine, carbazole, 3-methyl-acetophenone, 4-chloro-benzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, bis(2,4,6-trimethylbenzoyl)-phenylphosphineoxide, 2,4,6-trimethylbenzoyl-diphenyl-phosphineoxide, 2,4- diethylthioxanthone, bis-(2,6-dimethoxybenzoyl)-2,4,4-trimethylpentylphosphineoxide, etc., and it can be used by combining one or more elements selected from these polymerization initiators.

Among these polymerization initiators, as the polymerization initiator constituting the object formation ink 4A, it preferably includes bis(2,4,6-trimethylbenzoyl)-phenylphosphineoxide or 2,4,6-trimethylbenzoyl-diphenyl-phosphineoxide.

The object formation ink 4A can be cured in more appropriate curing rate by including such polymerization initiator, and the productivity of the three-dimensional shaped object 1 can be particularly excellent. Also, the strength, durability, and reliability of the three-dimensional shaped object 1 can be particularly excellent.

Specifically, when the object formation ink 4A includes bis (2,4,6-trimethylbenzoyl)-phenyl phosphine oxide as the polymerization initiator with the sacrificial layer formation ink 4B which will be described later, the controlling of the curing rate for the object formation ink 4A and the sacrificial layer formation ink 4B can be appropriately performed so that the productivity of the three-dimensional shaped object 1 can be further excellent.

When the object formation ink 4A includes bis(2,4,6-trimethylbenzoyl)-phenyl phosphine oxide as the polymerization initiator with the sacrificial layer formation ink 4B which will be described later, the content rate of bis(2,4,6-trimethylbenzoyl)-phenyl phosphine oxide in the object formation ink 4A is preferably higher than the content rate of bis(2,4,6-trimethylbenzoyl)-phenyl phosphine oxide in the sacrificial layer formation ink 4B.

Therefore, each of the object formation ink 4A and the sacrificial layer formation ink 4B can be cured in more appropriate curing rate.

The content rate of the polymerization initiator in the object formation ink 4A is not particularly limited, but it is preferably higher than the content rate of the polymerization initiator in the sacrificial layer formation ink 4B.

Therefore, each of the object formation ink 4A and the sacrificial layer formation ink 4B can be cured in more appropriate curing rate.

Further, for example, by adjusting processing conditions of the curing process, after the curing process is completed, the polymerization degree of the sacrificial layer 8 can be relatively low while the cure degree of the three-dimensional shaped object 1 keeps sufficiently high. As a result, the sacrificial layer 8 can be easily removed in the sacrificial layer removing process so that the productivity of the three-dimensional shaped object 1 can be particularly excellent.

Also, it is not required to increase the energy emission-does so that it is preferable from the viewpoint of the energy saving.

Specifically, when the content rate of the polymerization initiator in the object formation ink 4A is denoted as $X_1$ [mass %] and the content rate of the polymerization initiator in the sacrificial layer formation ink 4B is denoted as $X_2$ [mass %], it preferably satisfies the relationship of $1.05 \leq X_1/X_2 \leq 2.0$, and more preferably satisfies the relationship of $1.1 \leq X_1/X_2 \leq 1.5$.

Therefore, each of the object formation ink 4A and the sacrificial layer formation ink 4B can be cured in more appropriate curing rate so that the productivity of the three-dimensional shaped object 1 can be further excellent.

As a specific value of the content rate of polymerization initiator in the object formation ink 4A, it is preferably equal to or more than 3.0 mass % and equal to or less than 18 mass %, and more preferably, it is equal to or more than 5.0 mass % and equal to or less than 15 mass %. Therefore, the object formation ink 4A can be cured in more appropriate curing rate, and the productivity of the three-dimensional shaped object 1 can be particularly excellent. Also, the mechanical strength and the shape stability of the three-dimensional shaped object (object) 1 formed by curing the object formation ink 4A can be particularly excellent. As a result, the strength, durability and reliability of the three-dimensional shaped object 1 can be particularly excellent.

A specific example of the mixing ratio of the curing resin and the polymerization initiator in the object formation ink 4A (ink components without "other components" disclosed below") will be described below, but needless to say, the components of the object formation ink in the present invention are not limited to the following components described below.

Example of Mixing Ratio acrylic acid 2-(2-vinyloxyethoxy) ethyl: 32 pts. mass
polyether-based aliphatic urethane acrylate oligomer: 10 pts. mass
2-hydroxy-3-phenoxy-propylacrylate: 13.75 pts. mass
dipropylene glycol diacrylate: 15 pts. mass
4-hydroxybutyl acrylate: 20 pts. mass
bis(2,4,6-trimethylbenzoyl)-phenyl phosphine oxide: 5 pts. mass
2,4,6-trimethylbenzoyl-diphenyl-phosphine oxide: 4 pts. mass When it is the aforementioned maxing ratio, the aforementioned effects are remarkably demonstrated.

Other Components

Further, the object formation ink 4A may include components other than the aforementioned components.

As such components, for example, the followings are exemplified: various coloring agents such as pigment, dye, etc.; dispersant; surfactant; sensitizer; polymerization accelerator; solvent; penetration enhancer; wetting agent (humectant); fixing agent; antifungal agent; preservative; antioxidant; ultraviolet absorber; chelating agent; pH adjuster; thickener; filler; aggregation inhibitor; defoamer, etc.

Specifically, the three-dimensional shaped object 1, which is colored the corresponding color of the coloring agent, can be obtained by including the coloring agent in the object formation ink 4A.

Particularly, the light resistance of the object formation ink 4A and the three-dimensional shaped object 1 can be excellent by including the pigment as the coloring agent. As the pigments, inorganic pigments and organic pigments can be used.

As the inorganic pigments, for example, the followings are exemplified: carbon blacks (C.I. pigment black 7) such as furnace black, lampblack, acetylene black, channel black, etc., iron oxide, titanium oxide, etc., and it can be used by combining one or more elements selected from these inorganic pigments.

Among these inorganic pigments, titanium oxide is preferred to present desirable white.

As the organic pigments, for example, the followings are exemplified: an azo pigment such as an insoluble azo pigment, a condensed azo pigment, azolake, a chelate azo pigment, etc., a polycyclic pigment such as a phthalocyanine pigment, a perylene and perynone pigment, an anthraquinone pigment, a quinacridone pigment, a dioxane pigment, a thioindigo pigment, an isoindolinone pigment, a quinophthalone pigment, etc., dye chelate (e.g., basic dye type chelate, acidic dye type chelate, etc.), dye type lake (e.g., basic dye type lake, acidic dye type lake, etc.), nitro pigment, nitroso pigment, aniline black, daylight fluorescent pigment, etc., and it can be used by combining one or more elements selected from these organic pigments.

In further detail, as the carbon black used as a black pigment (black), for example, the followings are exemplified: No. 2300, No. 900, MCF88, No. 33, No. 40, No. 45, No. 52, MA7, MA8, MA100, No. 2200B, etc. (the aforementioned pigments made by Mitsubishi Chemical Corporation), Raven 5750, Raven 5250, Raven 5000, Raven 3500, Raven 1255, Raven 700, etc. (the aforementioned pigments made by Carbon Columbia Corporation), Regal 400R, Regal 330R, Regal 660R, Mogul L, Monarch 700, Monarch 800, Monarch 880, Monarch 900, Monarch 1000, Monarch 1100, Monarch 1300, Monarch 1400, etc. (the aforementioned pigments made by CABOT JAPAN K.K.), Color Black FW1, Color Black FW2, Color Black FW2V, Color Black FW18, Color Black FW200, Color Black 5150, Color Black 5160, Color Black S 170, Printex 35, Printex U, Printex V, Printex 140U, Special Black 6, Special Black 5, Special Black 4A, Special Black 4, etc. (the aforementioned pigments made by Degussa Corporation).

As a white pigment (white), for example, the followings are exemplified: C.I. Pigment White 6, 18, 21, etc.

As a yellow pigment (yellow), for example, for example, the followings are exemplified: C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, 180, etc.

As a magenta pigment (magenta), for example, the followings are exemplified: C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, 245, or C.I. Pigment Violet 19, 23, 32, 33, 36, 38, 43, 50, etc.

As a cyan pigment (cyan), for example, the followings are exemplified: for example, C.I. Pigment Blue 1, 2, 3, 15, 15:1, 15:2, 15:3, 15:34, 15:4, 16, 18, 22, 25, 60, 65, 66, C.I. Bat Blue 4, 60, etc.

Further, as pigments other than the aforementioned pigments, for example, the followings are exemplified: C.I. Pigment Green 7, 10, C.I. Pigment Brown 3, 5, 25, 26, C.I. Pigment Orange 1, 2, 5, 7, 13, 14, 15, 16, 24, 34, 36, 38, 40, 43, 63, etc.

When the object formation ink 4A includes pigments, the average particle diameter of the pigments is preferably equal to or less than 300 nm, and it is more preferably equal to or more than 50 nm and equal to or less than 250 nm.

Therefore, the ejection stability of the object formation ink 4A or the dispersion stability of the pigments in the object formation ink 4A can be particularly excellent, and an image forming further excellent image quality can be provided.

Further, as a dye, for example, the followings are exemplified: an acidic dye, a direct dye, a reactive dye, a basic dye, etc. It can be used by combining one or more elements selected from these dyes.

As a specific example of dyes, for example, the followings are exemplified: C.I. Acid Yellow 17, 23, 42, 44, 79, 142, C.I. Acid Red 52, 80, 82, 249, 254, 289, C.I. Acid Blue 9, 45, 249, C.I. Acid Black 1, 2, 24, 94, C.I. Food Black 1, 2, C.I. Direct Yellow 1, 12, 24, 33, 50, 55, 58, 86, 132, 142, 144, 173, C.I. Direct Red 1, 4, 9, 80, 81, 225, 227, C.I. Direct Blue 1, 2, 15, 71, 86, 87, 98, 165, 199, 202, C.I. Direct Black 19, 38, 51, 71, 154, 168, 171, 195, C.I. Reactive Red 14, 32, 55, 79, 249, C.I. Reactive Black 3, 4, 35, etc.

When the object formation ink 4A includes the coloring agent, the content ratio of the coloring agent in the object formation ink 4A is preferably equal to or more than 1 mass % and equal to or less than 20 mass %. Therefore, particularly excellent concealability and color reproducibility are obtained.

Specifically, when the object formation ink 4A includes titanium oxide as the coloring agent, the content ratio of the titanium oxide in the object formation ink 4A is preferably equal to or more than 12 mass % to equal to or less than 18 mass %, and more preferably, equal to or more than 14 mass % and equal to or less than 16 mass %. Therefore, particularly excellent concealability is obtained.

When the object formation ink 4A includes the pigment, and when it further includes the dispersant, the dispersibility of the pigment can be excellent.

As the dispersant, it is not particularly limited, but for example, the following is exemplified: a dispersant commonly used for adjusting pigment dispersion liquid such as a polymer dispersant, etc.

As a specific example of the polymer dispersant, for example, the followings are exemplified: a polymer dispersant mainly composed of one or more of polyoxyalkylene polyalkylene polyamine, vinyl polymer and copolymer, acrylic polymer and copolymer, polyester, polyamide, polyimide, polyurethane, amino-based polymer, silicon-containing polymer, sulfur-containing polymer, fluorine-containing polymer, and epoxy resin, etc.

As the polymer dispersant available on market, for example, the followings are exemplified: AJISPER SERIES made by Ajinomoto Fine-Techno Co., Inc., SOLSPERSE 36000 available from Noveon Inc., DISPERBYK SERIES made by BYK Co., DISPARITY RON SERIES made by Kusumoto Chemical Ltd., etc.

When the object formation ink 4A includes the surfactant, the wear resistance of the three-dimensional shaped object 1 can be further excellent.

As the surfactant, it is not particularly limited, but for example, polyester-modified silicone, polyether-modified silicone, etc. as the silicone-based surfactant can be used, and it is preferable that polyether-modified polydimethylsiloxane or polyester-modified polydimethyl siloxane is used.

As a specific example of the surfactant, for example, the followings are exemplified: BYK-347, BYK-348, BYK-UV3500, 3510, 3530, 3570 (the aforementioned products are the trade name of BYK Co.), etc.

Further, the object formation ink 4A may include a solvent.

Therefore, viscosity adjustment of the object formation ink 4A can be appropriately performed, and even if the object formation ink 4A includes high viscosity components, the ejection stability of the object formation ink 4A by the ink-jet method can be particularly excellent.

As a solvent, for example, the followings are exemplified: (poly)alkylene glycol monoalkyl ethers such as ethylene glycol monomethyl ether, ethylene glycol monoethyl ether, propylene glycol monomethyl ether, propylene glycol monoethyl ether, etc.; acetic acid esters such as ethyl acetate, n-propyl acetate, iso-propyl acetate, n-butyl acetate, iso-butyl acetate, etc.; aromatic hydrocarbons such as benzene, toluene, xylene, etc.; ketones such as methylethyl ketone, acetone, methyl isobutyl ketone, ethyl-n-butyl ketone, diisopropyl ketone, acetylacetone, etc.; alcohols such as ethanol, propanol, butanol, etc., and it can be used by combining one or more elements selected from these solvents.

Further, the viscosity of the object formation ink 4A is preferably equal to or more than 10 mPa·s and equal to or less than 30 mPa·s, and more preferably, equal to or more than 15 mPa·s and equal to or less than 25 mPa·s.

Therefore, the ejection stability of the object formation ink 4A by the ink-jet method can be particularly excellent. In this specification, the viscosity is the value measured in 25° C. by using E-type viscometer (Tokyo Keiki Co., Ltd. VISCONIC ELD).

Further, plural types of the object formation inks 4A may be used in the manufacturing of the three-dimensional shaped object 1.

For example, the object formation ink 4A that includes the coloring agent (color ink) and the object formation ink 4A that does not include the coloring agent (clear ink) may be used.

Therefore, for example, in an appearance of the three-dimensional shaped object 1, the object formation ink 4A that includes the coloring agent is used as the object formation ink 4A that applies to the region influencing the color tone, and in an appearance of the three-dimensional shaped object 1, the object formation ink 4A that does not include the coloring agent can be used as the object formation ink 4A that applies to the region not influencing the color tone so that it has an advantage in the viewpoint from the reduction of the production cost of the three-dimensional shaped object 1.

Further, in the finally obtained three-dimensional shaped object 1, plural types of the object formation inks 4A may be commonly used to provide the region (coating layer) formed by using the object formation ink 4A that does not include the coloring agent on the outer surface of the region formed by using the object formation ink 4A that includes the coloring agent.

The part including the coloring agent (specifically, pigments) gets more brittle than the part where the coloring agent is not included so that it is easily scratched or chipped, but by providing the region (coating layer) formed by using the object formation ink 4A that does not include the coloring agent, it can effectively prevent such problem from occurring. Also, even if the surface is worn due to the long term usage of the three-dimensional shaped object 1, it can effectively prevent the color tone of the three-dimensional shaped object 1 from changing and it can be suppressed.

Further, for example, the plural types of the object formation ink 4A that includes coloring agent having different components may be used.

Therefore, the reproducible range which can reproduce colors can be widened by combining these object formation inks 4A.

When plural types of the object formation inks 4A are used, at least the object formation ink 4A of cyan, the object formation ink 4A of magenta, and the object formation ink 4A of yellow are preferably used.

Therefore, the reproducible range which can represent colors can be widened by combining these object formation inks 4A.

Further, by commonly using the object formation ink 4A of white and the object formation ink 4A of other colors, for example, the following effects can be obtained.

That is, the finally obtained three-dimensional shaped object 1 can be provided with the first region where the object formation ink 4A of white is applied and the region (the second region) provided in the outer surface side than the first region where the object formation ink 4A of a color other than white is applied. Therefore, the first region where the object formation ink 4A of white is applied can demonstrate concealability, and colorfulness of the three-dimensional shaped object 1 can be enhanced.

Sacrificial Layer Formation Ink

A sacrificial layer formation ink 4B includes at least a curing resin (curing component).

Curing Resin

As the curing resin (curing component) constituting the sacrificial layer formation ink 4B, for example, it may be the same curing resin (curing component) exemplified as the structural component of the object formation ink 4A.

Specifically, the curing resin (curing component) constituting the sacrificial layer formation ink 4B and the curing resin (curing component) constituting the aforementioned object formation ink 4A are preferably cured by the same type of energy line.

Therefore, it can effectively prevent the structure of the three-dimensional shaped object manufacturing device from getting complex, and the productivity of the three-dimensional shaped object 1 can be particularly excellent. Further, the surface shape of the three-dimensional shaped object 1 can be controlled more surely.

Also, the curing material of the sacrificial layer formation ink 4B having hydrophilicity is preferably used. Therefore, it is possible to easily remove the sacrificial layers 8 by aqueous liquid such as water, etc.

Among various curing components, specifically, the sacrificial layer formation ink 4B preferably includes one or more elements selected from the group composed of tetrahydrofurfuryl(meth)acrylate, ethoxyethyl(meth)acrylate, polyethylene glycol di(meth)acrylate, and (meth)acryloyl morpholine, (meth)acrylic acid 2-(2-vinyloxyethoxy)ethyl.

Therefore, the sacrificial layer formation ink 4B can be cured in more appropriate curing rate, and the productivity of the three-dimensional shaped object 1 can be particularly excellent. Further, the hydrophilicity of the curing material can be more suitable so that the sacrificial layers 8 can be easily removed.

Further, the mechanical strength and the shape stability of the sacrificial layers 8 formed by curing the sacrificial layer formation ink 4B can be particularly excellent. As a result, at the time of manufacturing the three-dimensional shaped object 1, the sacrificial layers 8 of the lower layer (the first layer) can appropriately support the object formation ink 4A in order to form the upper layer (the second layer). Therefore, it can appropriately prevent unexpected deformation (specifically, sagging, etc.) of the three-dimensional shaped object 1 (the sacrificial layers 8 of the first layer functions as a support material), and the dimensional accuracy of the finally obtained three-dimensional shaped object 1 can be further excellent.

Specifically, when the sacrificial layer formation ink 4B includes (meth)acryloyl morpholine, the following functions are obtained.

That is, even if the curing reaction progresses, in a state that it is not complete cure (polymer of (meth)acryloyl morpholine in a state that it is not complete cure), (meth) acryloyl morpholine has high resolvability to various solvents such as water, etc. Therefore, in the aforementioned sacrificial layer removing process, while it effectively prevents defects from occurring to the object 11, the sacrificial layers 8 can be selectively, surely, and efficiently removed. As a result, the productivity of the three-dimensional shape object 1 can be excellent in a desired form with higher reliability.

Also, when the sacrificial layer formation ink 4B includes tetrahydrofurfuryl(meth)acrylate, the flexibility is kept after the curing so that the effect to enhance removability by easily gelating the sacrificial layers 8 removed by the processing of liquid is obtained.

Further, when the sacrificial layer formation ink 4B includes ethoxyethoxyethyl(meth) acrylate, the tackiness after the curing is easily remained so that the effect to enhance removability by the liquid that removes the sacrificial layers 8 is obtained.

Furthermore, when the sacrificial layer formation ink 4B includes polyethylene glycol di(meth) acrylate, and when the liquid for removing the sacrificial layers 8 is water as a main component, the resolvability to the liquid is enhanced so that the effect as an easy removal is obtained.

When the sacrificial layer formation ink 4B includes the aforementioned specific curing components (one or more elements selected from the group composed of tetrahydrofurfuryl(meth) acrylate, ethoxyethoxyethyl(meth)acrylate, polyethylene glycol di(meth) acrylate, and (meth) acryloyl morpholine), the ratio of the specific curing components with respect to the entire curing component composing the sacrificial layer formation ink 4B is preferably equal to or more than 80 mass %, more preferably equal to or more than 90 mass %, and further preferably 100 mass %. Therefore, the aforementioned effects are remarkably demonstrated.

The content ratio of the curing component in the sacrificial layer formation ink 4B is preferably equal to or more than 83 mass % and equal to or less than 98.5 mass %, and more preferably, equal to or more than 87 mass % and equal to or less than 95.4 mass %.

Therefore, the shape stability of the formed sacrificial layers 8 can be particularly excellent, when the unit layers 7 are laminated at the time of manufacturing he three-dimensional shaped object 1, it can effectively prevent the unexpected deformation from occurring in the lower side of the unit layers 7, and the upper side of the unit layers 7 can be appropriately supported. As a result, the dimensional accuracy of the finally obtained three-dimensional shaped object 1 can be excellent. Further, the productivity of the three-dimensional shaped object 1 can be particularly excellent.

Polymerization Initiator

Also, the sacrificial layer formation ink 4B preferably includes the polymerization initiator.

Therefore, the curing rate of the sacrificial layer formation ink 4B at the time of manufacturing the three-dimensional shaped object 1 can be appropriately accelerated, and the productivity of the three-dimensional shaped object 1 can be particularly excellent.

Further, the shape stability of the formed sacrificial layers 8 can be particularly excellent, and when the unit layers 7 are laminated at the time of manufacturing the three-dimensional shaped object 1, it can effectively prevent the unexpected deformation from occurring in the lower side of the unit layers 7, and the upper side of the unit layers 7 can be appropriately supported. As a result, the dimensional accuracy of the finally obtained three-dimensional shaped object 1 can be particularly excellent.

As the polymerization initiator constituting the sacrificial layer formation ink 4B, for example, it may be the same polymerization initiators exemplified as the structural component of the object formation ink 4A.

As the polymerization initiator, the sacrificial layer formation ink 4B preferably includes bis (2,4,6-trimethylbenzoyl)-phenyl phosphine oxide, or 2,4,6-trimethylbenzoyl-diphenyl-phosphine oxide.

By including such polymerization initiator, the sacrificial layer formation ink 4B can be cured in more appropriate curing rate, and the productivity of the three-dimensional shaped object 1 can be particularly excellent.

Also, the mechanical strength and the shape stability of the sacrificial layers 8 formed by curing the sacrificial layer formation ink 4B can be particularly excellent. As a result, at the time of manufacturing the three-dimensional shaped object 1, the lower layer (the first layer) of the sacrificial layers 8 can more appropriately support the object formation ink 4A to form the upper layer (the second layer). Therefore, it can more appropriately prevent the unexpected deformation (specifically, sagging, etc.) from occurring in the object 11 (the first layer of the sacrificial layers 8 functions as a support material), and the dimensional accuracy of the finally obtained three-dimensional shaped object 1 can be further excellent.

As a specific value of the content ratio of the polymerization initiator in the sacrificial layer formation ink 4B, it is preferably equal to or more than 1.5 mass % and equal to or less than 17 mass %, and more preferably, equal to or more than 4.6 mass % and equal to or less than 13 mass %.

Therefore, the sacrificial layer formation ink 4B can be cured in more appropriate curing rate, and the productivity of the three-dimensional shaped object 1 can be particularly excellent.

Further, the mechanical strength and the shape stability of the sacrificial layers 8 formed by curing the sacrificial layer formation ink 4B can be particularly excellent. As a result, at the time of manufacturing the three-dimensional shaped object 1, the lower layer (the first layer) of the sacrificial layers 8 can more appropriately support the object formation ink 4A to form the upper layer (the second layer). Therefore, it can more appropriately prevent the unexpected deformation (specifically, sagging, etc.) from occurring in the object 11 (the first layer of the sacrificial layers 8 functions as a support material), and the dimensional accuracy of the finally obtained three-dimensional shaped object 1 can be further excellent.

A specific preferred example of the mixing ratio of the curing resin and the polymerization initiator in the sacrificial layer formation ink 4B (hereinafter referred to as ink composition other than "other components") will be described, but needless to say, the sacrificial layer formation ink composition in the present invention is not limited to the following compositions.

Example 1 of Mixing Ratio tetrahydrofurfuryl acrylate: 36 pts. mass
ethoxyethoxyethyl acrylate: 55.75 pts. mass
bis (2,4,6-trimethylbenzoyl)-phenyl phosphine oxide: 3 pts. mass
2,4,6-trimethylbenzoyl-diphenyl-phosphine oxide: 5 pts. mass Example 2 of Mixing Ratio dipropylene glycol diacrylate: 37 pts. mass
polyethylene glycol(400)diacrylate: 55.85 pts. mass
bis(2,4,6-trimethylbenzoyl)-phenyl phosphine oxide: 3 pts. mass
2,4,6-trimethylbenzoyl-diphenyl-phosphine oxide: 4 pts. mass Example 3 of Mixing Ratio tetrahydrofurfuryl acrylate: 36 pts. mass
acryloyl morpholine: 55.75 pts. mass
bis(2,4,6-trimethylbenzoyl)-phenyl phosphine oxide: 3 pts. mass
2,4,6-trimethylbenzoyl-diphenyl-phosphine oxide: 5 pts. mass Example 4 of Mixing Ratio acrylic acid 2-(2-vinyloxyethoxy)ethyl: 36 pts. mass
polyethylene glycol(400)diacrylate: 55.75 pts. mass
bis(2,4,6-trimethylbenzoyl)-phenyl phosphine oxide: 3 pts. mass
2,4,6-trimethylbenzoyl-diphenyl-phosphine oxide: 5 pts. mass When it is the aforementioned mixture ratios, the aforementioned effects can be remarkably demonstrated.

Other Components

Further, the sacrificial layer formation ink 4B may include components other than the aforementioned components. As such components, for example, the followings are exemplified: various coloring agents such as pigment, dye, etc.; dispersant; surfactant; sensitizer; polymerization accelerator; solvent; penetration enhancer; wetting agent (humectant); fixing agent; antifungal agent; preservative; antioxidant; ultraviolet absorber; chelating agent; pH adjuster; thickener; filler; aggregation inhibitor; defoamer, etc.

Specifically, by including the coloring agent in the sacrificial layer formation ink 4B, the visibility of the sacrificial layers 8 is improved, and it can more surely prevent at least a part of the sacrificial layers 8 from remaining unexpectedly in the finally obtained three-dimensional shaped object 1.

As the coloring agent constituting the sacrificial layer formation ink 4B, for example, it may be the same coloring agents exemplified as the structural component of the object formation ink 4A. It preferably includes the coloring agent which is different color from the color of the object 11 laminating with the sacrificial layers 8 formed by the sacrificial layer formation ink 4B when viewing the surface of the three-dimensional shaped object 1 in a normal direction. Therefore, the aforementioned effects are remarkably demonstrated.

When the sacrificial layer formation ink 4B includes the pigment, and when it further includes the dispersant, the dispersibility of the pigment can be excellent. As the dispersant composing the sacrificial layer formation ink 4B, for example, it may be the same dispersants exemplified as the structural component of the object formation ink 4A.

Further, the viscosity of the sacrificial layer formation ink 4B is preferably equal to or more than 10 mPa·s and equal to or less than 30 mPa·s, and more preferably, equal to or more than 15 mPa·s and equal to or less than 25 mPa·s.

Therefore, the ejection stability of the sacrificial layer formation ink 4B by the ink-jet method can be particularly excellent.

Further, plural types of the sacrificial layer formation inks 4B may be used in the manufacturing of the three-dimensional shaped object 1.

For example, two or more sacrificial layer formation inks 4B having different dynamic viscoelasticity to each other at the time of curing the object formation ink 4A may be provided.

Therefore, a plurality of regions having different fine textures to each other can be obtained in the finally obtained three-dimensional shaped object 1. As a result, it is possible to present more complex appearance, and the aesthetic appearance (aesthetic sense), high-grade sense, etc. can be particularly excellent.

The ink-set may be provided with at least one type of the object formation ink (the first ink) 11' and at least one type of the sacrificial layer formation ink (the second ink) 12', but it may be also provided with the third ink which is different from these inks.

4. Composition for Three-Dimensional Shaped Object

Next, the composition for three-dimensional shaped object will be described in detail.

The composition for three-dimensional shaped object includes powder for three-dimensional shaped object and a water-soluble resin 64.

Each component will be described in detail below.

Powder for Three-Dimensional Shaped Object

The powder for three-dimensional shaped object is provided with a plurality of particles 63.

As the particles 63, any particles can be used, but particles composed of porous particles are preferred. Therefore, at the time of manufacturing the three-dimensional shaped object 1, the curing resin 44 can appropriately penetrate inside the holes and as a result, it can be used for the manufacturing of the three-dimensional shaped object with excellent mechanical strength.

As the structural material of the porous particles in the powder for three-dimensional shaped object, for example, the followings are exemplified: an inorganic material, an organic material, combination of these materials, etc.

As the inorganic material in the porous particles, for example, the followings are exemplified: various metals, various metal compounds, etc. As the metal compounds, for example, the followings are exemplified: various metal oxides such as silica, alumina, titanium oxide, zinc oxide, zircon oxide, tin oxide, magnesium oxide, potassium titanate, etc.; various metal hydroxides such as magnesium hydroxide, aluminum hydroxide, calcium hydroxide, etc.; various metal nitrides such as, silicon nitride, titanium nitride, aluminum nitride, etc.; various metal carbides such as silicon carbide, titanium carbide, etc.; various metal sulfides such as zinc sulfide, etc.; various metal carbonates such as calcium carbonate, magnesium carbonate, etc.; various metal hydrosulfates such as calcium sulfate, magnesium sulfate, etc.; various metal silicates such as calcium silicate, magnesium silicate, etc.; various metal phosphates such as calcium phosphate, etc.; various metal borates such as aluminum borate, magnesium borate, etc., combination of these compounds, etc.

As the organic material composing the porous particles, for example, the followings are exemplified: synthetic resin, natural polymer, etc., and more specifically, the followings are exemplified: polyethylene resin; polypropylene; polyethylene oxide; polypropylene oxide; polyethylenimine; polystyrene; polyurethane; polyuria; polyester; silicone resin; acrylic silicone resin; polymer including (meth)acrylicacidester such as polymethylmethacrylate, etc. as a constituent monomer; cross polymer including (meth)acrylicacidester such as methylmethacrylate crosspolymer, etc. as a constituent monomer (ethylene acrylic acid copolymer resin, etc.); polyamide resin such as Nylon 12, Nylon 6, copolymer nylon, etc.; polyimide; carboxymethyl cellulose; gelatin; starch; chitin; chitosan, etc.

Among these compounds, the porous particles are preferably composed of the inorganic material, more preferably composed of the metal oxide, and further preferably composed of silica. Therefore, the mechanical strength, the light resistance, etc. of the three-dimensional shaped object can be particularly excellent. Also, specifically, when the porous particles are composed of silica, the aforementioned effects are more remarkably demonstrated. Further, silica has excellent fluidity so that it has an advantage for forming layers having higher thickness uniformity, and the productivity and dimensional accuracy of the three-dimensional shaped object 1 can be particularly excellent.

As silica, silica, which is available in market, can be used. Specifically, for example, the followings are exemplified: Mizukasil P-526, Mizukasil P-801, Mizukasil NP-8, Mizukasil P-802, Mizukasil P-802Y, Mizukasil C-212, Mizukasil P-73, Mizukasil P-78A, Mizukasil P-78F, Mizukasil P-87, Mizukasil P-705, Mizukasil P-707, Mizukasil P-707D, Mizukasil P-709, Mizukasil C-402, Mizukasil C-484 (the aforementioned products made by Mizusawa Chemical Industry Co., Ltd.), Tokusil U, Tokusil UR, Tokusil GU, Tokusil AL-1, Tokusil GU-N, Tokusil N, Tokusil NR, Tokusil PR, Saw Rex, Fine seal E-50, Fine seal T-32, Fine Seal X-30, Fine Seal X-37, Fine Seal X-37B, Fine Seal X-45, Fine Seal X-60, Fine Seal X-70, Fine seal RX-70, Fine seal A, Fine seal B (the aforementioned products made by Tokuyama Corporation), Sipernat, Carplex FPS-101, Carplex CS-7, Carplex 22S, Carplex 80, Carplex 80D, Carplex XR, Carplex 67 (the aforementioned products made by DSL. Japan Ltd.), Syloid 63, Syloid 65, Syloid 66, Syloid 77, Syloid 74, Syloid 79, Syloid 404, Syloid 620, Syloid 800, Syloid 150, Syloid 244, Syloid 266 (the aforementioned products made by Fuji Silysia Chemical Co., Ltd.), Nippujeru AY-200, Nippujeru AY-6A2, Nippujeru AZ-200, Nippujeru AZ-6A0, Nippujeru BY-200, Nippujeru CX-200, Nippujeru CY-200, Nipseal E-150J, Nipseal E-220A, Nipseal E-200A (the aforementioned products made by Tosoh Silica Co., Ltd.), etc.

Further, it is preferable that the hydrophobic treatment is applied to the porous particles. In general, the curing resin included in the object formation ink 4A and the sacrificial layer formation ink 4B tends to have hydrophobic property. Therefore, the curing resin 44 can appropriately penetrate inside the porous particles because the hydrophobic treatment is applied to the porous particles. As a result, anchor effect is remarkably demonstrated, and the mechanical strength of the obtained three-dimensional shaped object 1 can be further excellent. Also, when the hydrophobic treatment is applied to the porous particles, it can be appropriately reusable. In more specific description, when the hydrophobic treatment is applied to the porous particles, affinity of the water-soluble resin, which will be described later, and the porous particles is deteriorated so that it is prevented to penetrate inside the holes. As a result, in the manufacturing of the three-dimensional shaped object 1, the porous particles in the region where the ink was not applied can be collected in high purity because impurities are easily removed by washing by water, etc. Therefore, the collected powder for three-dimensional shaped object is mixed with the water-soluble resin, etc. in a predetermined ratio again so that the powder for three-dimensional shaped object which is surely controlled by the desired compound can be obtained.

As the hydrophobic treatment applied to the porous particles which are composed of the powder for three-dimensional shaped object, it may be any processing if the hydrophobic property is enhanced, but it is preferable to introduce hydrocarbon group. Therefore, the hydrophobic property of the particles can be enhanced. Also, the approximate uniformity of the hydrophobic treatment in each part (including the surface inside the holes) of each particle or particle surface can be enhanced.

As a compound used for the hydrophobic treatment, a silane compound including a silyl group is preferred. As a specific example of the compounds that can be used for the hydrophobic treatment, for example, the followings are exemplified: hexamethyldisilazane, dimethyldimethoxysilane, diethyldiethoxysilane, 1-propenylmethyldichlorosilane, propyldimethylchlorosilane, propylmethyldichlorosilane, propyltrichlorosilane, propyltriethoxysilane, propyltrimethoxysilane, styrylethyltrimethoxysilane, tetradecyltrichlorosilane, 3-thiocyanatepropyltriethoxysilane, p-tolyldimethylchlorosilane, p-tolylmethyldichlorosi lane, p-tolyltrichlorosilane, p-tolyltrimethoxysilane, p-tolyltriethoxysilane, di-n-propyldi-n-propoxysilane, diisopropyldiisopropoxysilane, di-n-butyldi-n-butyroxysilane, di-sec-butyldi-sec-butyroxysilane, di-t-butyldi-t-butyroxysilane, octadecyltrichlorosilane, octadecylmethyldiethoxysilane, octadecyltriethoxysilane, octadecyltrimethoxysilane, octadecyldimethylchlorosilane, octadecylmethyldichlorosilane, octadecylmethoxydichlorosilane, 7-octenyldimethylchlorosilane, 7-octenyltrichlorosilane, 7-octenyltrimethoxysilane, octylmethyldichlorosilane, octyldimethylchlorosilane, octyltrichlorosilane, 10-undecenyldimethylchlorosilane, undecyltrichlorosilane, vinyldimethylchlorosilane, methyloctadecyldimethoxysilane, methyldodecyldiethoxysilane, methyloctadecyldimethoxysilane, methyloctadecyldiethoxysilane, n-octylmethyldimethoxysilane, n-octylmethyldiethoxysilane, triacontyldimethylchlorosilane, triacontyltrichlorosilane, methyltrimethoxysilane, methyltriethoxysilane, methyltri-n-propoxysilane, methylisopropoxysilane, methyl-n-butyroxysilane, methyltri-sec-butyroxysilane, methyltri-t-butyroxysilane, ethyltrimethoxysilane, ethyltriethoxysilane, ethyltri-n-propoxysilane, ethylisopropoxysilane, ethyl-n-butyroxysilane, ethyltri-sec-butyroxysilane, ethyltri-t-butyroxysilane, n-propyltrimethoxysilane, isobutyl trimethoxysilane, n-hexyltrimethoxysilane, hexadecyltrimethoxysilane, n-octyltrimethoxysilane, n-dodecyltrimethoxysilane, n-octadecyltrimethoxysilane, n-propyltriethoxysilane, isobutyltriethoxysilane, n-hexyltriethoxysilane, hexadecyltriethoxysilane, n-octyltriethoxysilane, n-dodecyltrimethoxysilane, n-octadecyltriethoxysilane, 2-[2-(trichlorosilyl)ethyl]pyridine, 4-[2-(trichlorosilyl)ethyl]pyridine, diphenyldimethoxysilane, diphenyldiethoxysilane, 1,3-(trichlorosilyl methyl) heptacosane, dibenzyldimethoxysilane, dibenzyldiethoxysilane, phenyltrimethoxysilane, phenylmethydimethoxysilane, phenyldimethylmethoxysilane, phenyldimethoxysilane, phenyldiethoxysilane, phenylmethyldiethoxysilane, phenyldimethylethoxysilane, benzyltriethoxysilane, benzyltrimethoxysilane, benzylmethyldimethoxysilane, benzyldimethylmethoxysilane, benzyldimethoxysilane, benzyldiethoxysilane, henzylmethyldiethoxysilane, benzyldimethylethoxysilane, benzyltriethoxysilane, dibenzyldimethoxysilane, dibenzylethoxysilane, 3-acetoxypropyl-trimethoxysilane, 3-acryloxypropyl-trimethoxysilane, allyltrimethoxysilane, allyltriethoxysilane, 4-amino-butyl triethoxysilane, (aminoethyl aminomethyl)phenethyltrimethoxysilane, N-(2-aminoethyl)-3-aminopropylmethyldimethoxysilane, N-(2-aminoethyl)-3-aminopropyltrimethoxysilane, 6-(aminohexyl aminopropyl)trimethoxysilane, p-aminophenyltrimethoxysilane, p-aminophenylethoxysilane, m-aminophenyltrimethoxysilane, m-aminophenylethoxysilane, 3-aminopropyltrimethoxysilane, 3-aminopropyltriethoxysilane, co-aminoundecyltrimethoxysilane, amyltriethoxysilane, benzooxasilepindimethylester, 5-(bicycloheptenyl)triethoxysilane, bis(2-hydroxyethyl)-3-aminopropyltriethoxysilane, 8-bromo-octyltrimethoxysilane, bromophenyltrimethoxysilane, 3-bromo-propyltrimethoxysilane, n-butyltrimethoxysilane, 2-chloro-methyltriethoxysilane, chloromethylmethyldiethoxysilane, chloromethylmethyldiisopropoxysilan, p-(chloromethyl)phenyltrimethoxysilane, chloromethyltriethoxysilane, chlorophenyltriethoxysilane, 3-chloropropylmethyldimethoxysilane, 3-chloropropyltriethoxysilane, 3-chloropropyltrimethoxysilane, 2-(4-chloro-sulfonylphenyl)ethyltrimethoxysilane, 2-cyano-ethyltriethoxysilane, 2-cyano-ethyltrimethoxysilane, cyanomethylphenethyltriethoxysilane, 3-cyano-propyltriethoxysilane, 2-(3-cyclohexenyl)ethyltrimethoxysilane, 2-(3-cyclohexenyl)ethyltriethoxysilane, 3-cyclohexenyltrichlorosilane, 2-(3-cyclohexenyl)ethyltrichlorosilane, 2-(3-cyclohexenyl)ethyldimethylchlorosilane, 2-(3-cyclohexenyl)ethylmethyldichlorosilane, cyclohexyldimethylchlorosilane, cyclohexylethyldimethoxysilane, cyclohexylmethyldichlorosilane, cyclohexylmethyldimethoxysilane, (cyclohexyl methyl)trichlorosilane, cyclohexyltrichlorosilane, cyclohexyltrimethoxysilane, cyclooctyltrichlorosilane, (4-cyclooctenyl)trichlorosilane, cyclopentyltrichlorosilane, cyclopentyltrimethoxysilane, 1,1-diethoxy-1-silacyclopenta-3-ene, 3-(2,4-dinitrophenylamino)propyl triethoxysilane, dimethylchlorosilyl)methyl-7,7-dimethylnorpinane, (cyclohexyl aminomethyl)methyldiethoxysilane, (3-cyclopentadienyl propyl)triethoxysilane, N, N-diethyl-3-aminopropyl)trimethoxysilane, 2-(3,4-epoxy cyclohexyl)ethyltrimethoxysilane, 2-(3,4-epoxy cyclohexyl)ethyltriethoxysilane, (furfuryl oxymethyl)triethoxysilane, 2-hydroxy-4-(3-triethoxy propoxy)diphenylketone, 3-(p-methoxyphenyl)propylmethyldichlorosilane, 3-(p-methoxyphenyl)propyltrichlorosilane, p-(methylphenethyl)methyldichlorosilane, p-(methylphenethyl)trichlorosilane, p-(methylphenethyl) dimethylchlorosilane, 3-morpholinopropyltrimethoxysilane, (3-glycidoxypropyl)methyldiethoxysilane, 3-glycidoxypropyltrimethoxysilane, 2,3,4,7,7,-hexachloro-6-methyldiethoxysilyl-2-norbonene, 1,2,3,4,7,7,-hexachloro-6-methyl-triethoxysilyl-2-norbornene, 3-iodopropyltrimethoxysilane, 3-isocyanatepropyltriethoxysilane, (mercaptomethyl)methyldiethoxysilane, 3-mercaptopropylmethyldimethoxysilane, 3-mercaptopropyldimethoxysilane, 3-mercaptopropyltriethoxysilane, 3-methacryloxypropylmethyldiethoxysilane, 3-methacryloxypropyltrimethoxysilane, methyl{2-(3-trimethoxysilyl propyl-amino)ethylamino}-3-propionate, 7-octenyltrimethoxysilane, R—N-α-phenethyl-N'-triethoxysilylpropylurea, S—N-α-phenethyl-N'-triethoxysilylpropylurea, phenethyl trimethoxysilane, phenethylmethyldimethoxysilane, phenethyldimethylmethoxysilane, phenethyldimethoxysilane, phenethyldiethoxysilane, phenethylmethyldiethoxysilane, phenethyldimethylethoxysilane, phenethyltrimethoxysilane, (3-phenylpropyl)dimethylchlorosilane, (3-phenylpropyl)methyldichlorosilane, N-phenylaminopropyltrimethoxysilane, N-(triethoxysilyl propyl) dansylamide, N-(3-triethoxysilylpropyl)-4,5-dihydroimidazole, 2-(triethoxysilylethyl)-5-(chloroacetoxymethyl) bicycloheptane, (S)—N-triethoxysilylpropyl-O-mentcarbamate, 3-(triethoxysilylpropyl)-p-nitrobenzamide, 3-(triethoxysilyl)propylsuccinate anhydride, N-[5-(trimethoxysilyl)-2-aza-1-oxo-pentyl]caprolactam, 2-(trimethoxysilylethyl)pyridine, N-(trimethoxysilylethyl) benzyl-N,N,N-trimethylammoniumchloride, phenylvinyldiethoxysilane, 3-thiocyanate-propyltriethoxysilane, (toridecafluoro1,1,2,2,-tetrahydro-octyl)triethoxysilane, N-{3-(triethoxysilyl)propyl}phthalamic acid, (3,3,3-trifluoropropyl)methyldimethoxysilane, (3,3,3-trifluoro-propyl) trimethoxysilane, 1-trimethoxysilyl-2-(chloromethyl) phenylethane, 2-(trimethoxysilyl)ethylphenylsulfonylazide, β-trimethoxysilylethyl-2-pyridine, trimethoxysilylpropyldiethylenetriamine, N-(3-trimethoxysilylpropyl)pyrrole, N-trimethoxysilylpropyl-N,N,N-tributylammoniumbromide, N-trimethoxysilylpropyl-N,N,N-tributylammoniumchloride, N-trimethoxysilylpropyl-N,N,N-trimethylammoniumchloride, vinylmethyldiethoxysilane, vinyltriethoxysilane, vinyltrimethoxysilane, vinylmethyldimethoxysilane, vinyldimethylmethoxysilane, vinyldimethylethoxysilane, vinylmethyldichlorosilane, vinylphenyldichlorosilane, vinylphenyldiethoxysilane, vinylphenyldimethylsilane, vinylphenylmethylchlorosilane, vinyltriphenoxysilane, vinyltris-t-butoxysilane, adamantylethyltrichlorosilane, allylphenyl trichlorosilane, (aminoethylaminomethyl)phenethyltrimethoxysilane, 3-aminophenoxydimethylvinylsilane, phenyltrichlorosilane, phenyldimethyl chlorosilane, phenylmethyldichlorosilane, benzyltrichlorosilane, benzyldimethylchlorosilane, benzylmethyldichlorosilane, phenethyldiisopropylchlorosilane, phenethyltrichlorosilane, phenethyldimethylchlorosilane, phenethylmethyldichlorosilane, 5-(bicycloheptenyl)trichlorosilane, 5-(bicycloheptenyl)triethoxysilane, 2-(bicycloheptyl)dimethylchlorosilane, 2-(bicycloheptyl)trichlorosilane, 1,4-bis(trimethoxysilylethyl)benzene, bromophenyltrichlorosilane, 3-phenoxypropyldimethylchlorosilane, 3-phenoxypropyltrichlorosilane, t-butylphenylchlorosilane, t-butylphenylmethoxysilane, t-butylphenyldichlorosilane, p-(t-butyl)phenethyldimethylchlorosilane, p-(t-butyl) phenethyltrichlorosilane, 1,3(chlorodimethylsilylmethyl) heptacosane, ((chloromethyl)phenylethyl) dimethylchlorosilane, ((chloromethyl)phenylethyl) methyldichlorosilane, ((chloromethyl)phenylethyl) trichlorosilane, ((chloromethyl)phenylethyl) trimethoxysilane, chlorophenyltrichlorosilane, 2-cyanoethyltrichlorosilane, 2-cyanoethylmethyldichlorosilane, 3-cyanopropylmethyldiethoxysilane, 3-cyanopropylmethyldichlorosilane, 3-cyanopropylmethyldichlorosilane, 3-cyano-propyldimethylethoxysilane, 3-cyanopropylmethyldichlorosilane, 3-cyanopropyltrichlorosilane, fluorinated alkylsilane, etc., and it can be used by combining one or more elements selected from these compounds.

Among such compounds, hexamethyldisilazane is preferably used for the hydrophobic treatment. The hydrophobic property of the particles can be enhanced. Also, approximate uniformity of the hydrophobic treatment in each part (including the surface of the inside of the holes) of each particle or the surface of particles can be easily and surely enhanced.

When the hydrophobic treatment in which the silane compound is used is performed in the liquid phase, by immersing the particles to be treated by the hydrophobic treatment in the liquid which includes the silane compound, the desired reaction can be appropriately progressed and a chemical adsorption film of the silane compound can be formed.

Further, when the hydrophobic treatment in which the silane compound is used is performed in the gas phase, by aerating the particles 63 to be treated by the vapor treatment of the silane compound, the desired reaction can be appropriately progressed and a chemical adsorption film of the silane compound can be formed.

An average diameter of the particles 63 constituting the powder for three-dimensional shaped object is not particularly limited, but it is preferably equal to or more than 1 μm and equal to or less than 25 μm, and more preferably, equal to or more than 1 μm and equal to or less than 15 μm. Therefore, the mechanical strength of the three-dimensional shaped object 1 can be particularly excellent, and it effectively prevents the unexpected unevenness from occurring in the manufactured three-dimensional shaped object 1 so that the dimensional accuracy of the three-dimensional shaped object 1 can be particularly excellent. Further, the fluidity of the powder for three-dimensional shaped object, and the fluidity of the composition for three-dimensional shaped object including the powder for three-dimensional shaped object can be particularly excellent, and the productivity of the three-dimensional shaped object can be particularly excellent. In the present invention, the average diameter refers to the volume-based average diameter, and for example, a sample is added to methanol, and the dispersion liquid in which it was dispersed for 3 minutes in the ultrasonic disperser is measured in a coulter-counter method particle size distribution measurement device (TA-II TYPE made by COULTER ELECTRONICS INS) so that it can be measured by using 50 μm aperture.

Dmax of the particles 63 constituting the powder for three-dimensional shaped object is preferably equal to or more than 3 μm and equal to or less than 40 μm, and more preferably, equal to or more than 5 μm and equal to or less than 30 μm. Therefore, the mechanical strength of the three-dimensional shaped object 1 can be particularly excellent, and it effectively prevents the unexpected unevenness from occurring in the manufactured three-dimensional shaped object 1 so that the dimensional accuracy of the three-dimensional shaped object 1 can be particularly excellent. Further, the fluidity of the powder for three-dimensional shaped object, and the fluidity of the composition for three-dimensional shaped object including the powder for three-dimensional shaped object can be particularly excellent, and the productivity of the three-dimensional shaped object 1 can be particularly excellent. Also, it can effectively prevent light from scattering by the particles 63 on the surface of the manufactured three-dimensional shaped object 1.

When the particles 63 are the porous particles, the hole ratio of the porous particles is preferably equal to or more than 50%, and more preferably, equal to or more than 55% and equal to or less than 90%. Therefore, it has sufficient spaces (holes) in which the curing resin penetrates, and the mechanical strength of the porous particles itself can be excellent, and as a result, the mechanical strength of the three-dimensional shaped object 1 in which the bonded resin in the holes are formed can be particularly excellent. In the present invention, the hole ratio of a particle is the ratio of holes (volume ratio), which are existed inside the particles, with respect to the apparent volume of the particles, and when a density of a particle is denoted as $\rho$ [g/cm$^3$], and when a real density of a constituent material of a particle is denoted as $\rho_0$ [g/cm$^3$], the value is represented by $\{(\rho_0-\rho)/\rho_0\} \times 100$.

When the particles 63 are the porous particles, the average hole diameter (pore diameter) of the porous particles is preferably equal to or more than 10 nm, and more preferably, equal to or more than 50 nm and equal to or less than 300 nm. Therefore, the mechanical strength of the finally obtained three-dimensional shaped object 1 can be particularly excellent. Also, in a case that a coloring ink, which includes a pigment, is used for the manufacturing of the three-dimensional shaped object 1, the pigment can appropriately retain in the holes of the porous particles. Therefore, it can prevent the pigments from spreading unexpectedly so that the object of the high-resolution image can be surely formed.

The particles 63 constituting the three-dimensional shaped object may be formed in any shape, but it is preferably spherical shape. Therefore, the fluidity of the powder for three-dimensional shaped object, and the fluidity of the composition for three-dimensional shaped object including the powder for three-dimensional shaped object can be particularly excellent, and the productivity of the three-dimensional shaped object 1 can be particularly excellent. It effectively prevents the unexpected unevenness from occurring in the manufactured three-dimensional shaped object 1 so that the dimensional accuracy of the three-dimensional shaped object 1 can be particularly excellent.

The powder for three-dimensional shaped object may include plural types of particles in which the aforementioned conditions (e.g., a constituent material of the aforementioned particles, a type of the hydrophobic treatment etc.) are different from each other.

A porosity of the powder for three-dimensional shaped object is preferably equal to or more than 70% and equal to or less than 98%, and more preferably, equal to or more than 75% and equal to or less than 97.7%. Therefore, the mechanical strength of the three-dimensional shaped object can be particularly excellent. Also, the fluidity of the powder for three-dimensional shaped object, and the fluidity of the composition for three-dimensional shaped object including the powder for three-dimensional shaped object can be particularly excellent, and the productivity of the three-dimensional shaped object can be particularly excellent. It effectively prevents the unexpected unevenness from occurring in the manufactured three-dimensional shaped object so that the dimensional accuracy of the three-dimensional shaped object can be particularly excellent. In the present invention, in a case that the powder for three-dimensional shaped object is filled in a predetermined volume (e.g., 100 mL) of a container, the porosity of the powder for three-dimensional shaped object refers to the ratio of sum of the volume of the holes provided in the entire particles constituting the powder for three-dimensional shaped object and the volume of the spaces existed between the particles, with respect to the volume of the aforementioned container. When a bulk density of the powder for three-dimensional shaped object is denoted as P [g/cm³], and when a real density of a constituent material of the powder for three-dimensional shaped object is denoted as $P_0$ [g/cm³], the value is represented by $\{(P_0-P)/P_0\} \times 100$.

A content ratio of the powder for three-dimensional shaped object in the composition for three-dimensional shaped object is preferably equal to or more than 10 mass % and equal to or less than 90 mass %, and more preferably, equal to or more than 15 mass % and equal to or less than 58 mass %. Therefore, the fluidity of the composition for three-dimensional shaped object can be sufficiently excellent, and the mechanical strength of the finally obtained three-dimensional shaped object 1 can be particularly excellent.

Water-Soluble Resin

The composition for three-dimensional shaped object includes a water-soluble resin 64 with a plurality of particles 63. The particles 63 are bonded (temporarily fixed) to each other by the water-soluble resin 64 (see FIG. 4) so that it can effectively prevent the particles 63 from spreading unexpectedly, etc. Therefore, the safety of the operator or the dimensional accuracy of the manufactured three-dimensional shaped object 1 can be improved.

In the present invention, the water-soluble resin may be any resin in which at least a part of resin is capable of solving in water, but for example, the solubility with respect to the water in 25° C. (soluble mass in 100 g water) is preferably equal to or more than 5 [g/100 g water], and more preferably, equal to or more than 10 [g/100 g water].

As the water-soluble resin 64, for example, the followings are exemplified: synthetic polymers such as polyvinyl alcohol (PVA), polyvinylpyrrolidone (PVP), sodium polyacrylate, polyacrylamide, modified polyamide, polyethylenimine, polyethylene oxide, etc., natural polymers such as cornstarch, mannan, pectin, agar, alginic acid, dextran, glue, gelatin, etc., semi-synthetic polymers such as carboxymethyl cellulose, hydroxyethyl cellulose, oxidized starch, modified starches, etc. It can be used by combining one or more elements selected from these compounds.

As an example of a water-soluble resin product, for example, the followings are exemplified: methylcellulose (trade name "METOLOSE SM-15" made by Shin-Etsu Chemical Co., Ltd.), hydroxyethylcellulose (trade name "AL-15" made by Fuji Chemical Co., Ltd), hydroxypropyl cellulose (trade name "HPC-M" mad by Nippon Soda Co., Ltd.), carboxymethylcellulose (trade name "CMC-30" made by Nichirin Chemical Co., Ltd.), sodium starch phosphate ester (trade name "HOSUTA 5100" made by Matsutani Chemical Industry Co., Ltd.), polyvinylpyrroidone (trade name "PVP K-90" made by Tokyo Chemicaly Industry Co., Ltd.), methylvinylether/maleic anhydride copolymer (trade name "AN-139" made by GAF Gauntlet Co., Ltd.), polyacrylamide (Wako Pure Chemical Industries, Ltd.), modified polyamide (modified nylon)(trade name "AQ NYLON" made by Toray Industries, Inc.), polyethylene oxide (trade name "PEO-1" made by Stell Chemical Co., Ltd., trade name "A1 Cox" made by Meisei Chemical Industry Co., Ltd.), ethylene oxide/propylene oxide random copolymer (trade name "A1 Cox EP" made by Meisei Chemical Industry Co., Ltd.), sodium polyacrylate (Wako Pure Chemical Industries, Ltd.), carboxy vinyl polymer/cross-linked acrylic water-soluble resin (trade name "AQUPEC" made by Sumitomo Seika Chemicals Co., Ltd.), etc.

Among such products, when the water-soluble resin 64 is polyvinyl alcohol, the mechanical strength of the three-dimensional shaped object 1 can be particularly excellent. Also, by adjusting saponification or degree of polymerization, the properties of the water-soluble resin 64 (e.g., water solubility, water resistance, etc.) or the properties of the composition for three-dimensional shaped object (e.g., viscosity, fixing force of the particles 63, wettability, etc.) can be appropriately controlled. Therefore, it can be appropriately attained by various manufacturing methods of the three-dimensional shaped object 1. Further, among the various water-soluble resins, polyvinyl alcohol is low cost and has the supply stability. Therefore, the production cost is suppressed and the three-dimensional shaped object 1 can be stably manufactured.

When the water-soluble resin 64 includes polyvinyl alcohol, saponification of polyvinyl alcohol is preferably equal to or more than 85 and equal to or less than 90. Therefore, solubility of polyvinyl alcohol to the water can be suppressed. Therefore, when the composition for three-dimensional shaped object includes water, lowering adhesiveness between the adjacent unit layers 7 can be effectively suppressed.

When the water-soluble resin 64 includes polyvinyl alcohol, the degree of the polymerization of polyvinyl alcohol is preferably equal to or more than 300 and equal to or less than 1000. Therefore, when the composition for three-dimensional shaped object includes water, the mechanical strength of each unit layer 7 or the adhesiveness between the adjacent unit layers 7 can be particularly excellent.

When the water-soluble resin 64 is polyvinylpyrroidone (PVP), the following effects are obtained. That is, polyvinylpyrroidone has excellent adhesiveness to various materials such as glass, metals, plastics, etc. so that the strength and the shape stability in the part of layers where the ink is not applied are particularly excellent, and the dimensional accuracy of the finally obtained three-dimensional shaped object 1 can be particularly excellent. Further, polyvinylpyrroidone has high-solubility to various organic solvents so that the fluidity of the composition for three-dimensional shaped object can be particularly excellent, and the layers 6 in which it more effectively prevents uneven thickness from forming unexpectedly can be appropriately formed, and the dimensional accuracy of the finally obtained three-dimensional shaped object 1 can be particularly excellent. Also, in the unattached particle removal process (after the object formation was completed), polyvinylpyrroidone has high-solubility to water so that among the particles 63 constituting each layer 6, the particles that are not bonded by the curing resin 44 can be easily and surely removed. Further, polyvinylpyrroidone has appropriate affinity with the powder for the three-dimensional shaped object so that it hardly penetrates inside the aforementioned holes 611, and on the other hand, the wettability to the surface of the particles 63 is relatively high. Therefore, the aforementioned temporarily fixing function can be more effectively demonstrated. Also, polyvinylpyrroidone has excellent affinity with various coloring agents so that when the object formation ink 4A and the sacrificial layer formation ink 4B including the coloring agent are used in the ink application process, it can effectively prevent the coloring agent from spreading unexpectedly. Further, polyvinylpyrroidone has antistatic function so that when the powder which is not formed into paste is used as the composition for three-dimensional shaped object in the layer forming process, it can effectively prevent the powder from spreading. Further, when the powder which is formed into paste is used as the composition for three-dimensional shaped object in the layer forming process, and when the paste type composition for three-dimensional shaped object includes polyvinylpyrroidone, it can effectively prevent bubbles from mixing into the composition for three-dimensional shaped object, and in the layer forming process, it can effectively prevent defects from occurring due to mixing the bubbles.

When the water-soluble resin 64 includes polyvinylpyrroidone, the weight-average molecular weight of polyvinylpyrroidone is preferably equal to or more than 10000 and equal to or less than 1700000, and more preferably, equal to or more than 30000 and equal to or less than 1500000. Therefore, the aforementioned function can be effectively demonstrated.

In the composition for three-dimensional shaped object, the water-soluble resin 64 is preferably formed in liquid form (e.g., dissolved state, molten state, etc.) at least in the layer forming process. Therefore, the thickness uniformity of the layers 6 formed by using the composition for three-dimensional shaped object can be easily and surely enhanced.

The content ratio of the water-soluble resin 64 in the composition for three-dimensional shaped object is preferably equal to or less than 15 vol. %, and more preferably, equal to or more than 2 vol. % and equal to or less than 5 vol. % with respect to the bulk volume of the powder for three-dimensional shaped object. Therefore, the function of the aforementioned water-soluble resin 64 is sufficiently demonstrated, and the spaces in which the object formation ink 4A and the sacrificial layer formation in 4B penetrate can be widely secured so that the mechanical strength of the three-dimensional shaped object 1 can be particularly excellent.

Solvent

The composition for three-dimensional shaped object composition may include a solvent in addition to the aforementioned water-soluble resin 64, and the powder for three-dimensional shaped object. Therefore, the fluidity of the composition for three-dimensional shaped object can be particularly excellent, and the productivity of the three-dimensional shaped object 1 can be particularly excellent.

The solvent preferably solves the water-soluble resin 64. Therefore, the fluidity of the composition for three-dimensional shaped object can be excellent, and it can more effectively prevent uneven thickness of the layers 6, which are formed by using the composition for three-dimensional shaped object, from forming unexpectedly. Further, when the layers 6 in which the solvent was removed are formed, the water-soluble resin 64 can be applied to the particles in higher uniformity and it can more effectively prevent the unevenness of compositions from occurring unexpectedly. Therefore, it can more effectively prevent the unevenness of mechanical strength from occurring unexpectedly in each part of the finally obtained three-dimensional shaped object 1 so that the reliability of the three-dimensional shaped object 1 can be more enhanced.

As a solvent constituting the composition for three-dimensional shaped object, for example, the followings are exemplified: water; alcoholic solvent such as methanol, ethanol, isopropanol, etc.; ketone solvents such as methyl ethyl ketone, acetone, etc.; glycol ether series such as ethylene glycol monoethyl ether, ethylene glycol monobutyl ether, etc., glycol ether acetate series such as propylene glycol 1-monomethyl ether 2-acetate, propylene glycol 1-monoethyl ether 2-acetate, etc.; polyethylene glycol, polypropylene glycol, etc. It can be used by combining one or more elements selected from these solvents.

Among such solvents, the composition for three-dimensional shaped object preferably includes water. Therefore, the water-soluble resin 64 can be surely solved, the fluidity of the composition for three-dimensional shaped object and the composition uniformity in the layers 6 formed by the composition for three-dimensional shaped object can be particularly excellent. Further, it is easy to remove water after the layers 6 were removed, and even if it is remained in the three-dimensional shaped object 1, it hardly exerts an adverse effect. Also, it has advantage from the viewpoint of safety for the operator and the environmental problems.

When the composition for three-dimensional shaped object includes a solvent, the content ratio of the solvent in the composition for three-dimensional shaped object is preferably equal to or more than 5 mass % and equal to or less than 75 mass %, and more preferably, equal to or more than 35 mass % and equal to or less than 70 mass %. Therefore, the effects by including the aforementioned solvents are remarkably demonstrated, and the solvent can be easily removed in the short-period of time in the manufacturing process of the three-dimensional shaped object 1 so that it has an advantage from the viewpoint of the improvement of the productivity.

Specifically, when the composition for three-dimensional shaped object includes water, the content ratio of water in the composition for three-dimensional shaped object is preferably equal to or more than 20 mass % and equal to or less than 73 mass %, and more preferably, equal to or more than 50 mass % and equal to or less than 70 mass %. Therefore, the aforementioned effects are remarkably demonstrated.

Other Components

Further, the composition for three-dimensional shaped object may include components other than the aforementioned components. As such components, for example, the followings are exemplified: polymerization initiator; polymerization accelerator; penetration enhancer; wetting agent (humectant); fixing agent; antifungal agent; preservative; antioxidant; ultraviolet absorber; chelating agent; pH adjuster, etc.

5. Three-Dimensional Shaped Object

The three-dimensional shaped object of the present invention can be manufactured by using the aforementioned manufacturing method, three-dimensional shaped object manufacturing device, and ink-set. Therefore, the three-dimensional shaped object with a smooth outer surface and high dimensional accuracy can be provided.

The use of the three-dimensional shaped object of the present invention is not limited, but the followings are exemplified: ornament exhibition such as dolls, figures, etc., medical equipment, etc.

Also, the three-dimensional shaped object of the present invention may be used for any of a prototype, a mass-produced product, and a made-to-order product.

Further, the three-dimensional shaped object of the present invention may be a model (e.g., models of vehicles such as car, motorcycle, ship, airplane, etc., a natural object (abiotic) such as stone, etc., various foods, etc.).

In the aforementioned description, the preferred embodiments of the present invention were described, but the present invention is not limited to these embodiments.

For example, in the aforementioned embodiments, in addition to the layer forming process and the ink ejecting process, it was described that the curing process is also repeated with the layer forming process and the ink application process. However, the curing process may not be repeated. For example, it may be collectively performed after the laminated body provided with a plurality of layers, which are not cured, was formed. Also, when the curing resin is not a curing component, the curing process can be omitted.

Further, in the manufacturing method of the present invention, a pretreatment process, an intermediate process, and a post-treatment process may be performed if necessary.

As the pretreatment process, for example, the followings are exemplified: a modeling stage cleaning process, etc.

As the post-treatment process, for example, the followings are exemplified: a cleaning process, a shape adjustment process for deburring, etc., a coloring process, a coating layer formation process, a light irradiation process for surely curing uncured resin, a curable resin curing completion process for performing a heating process, etc.

Also, in the aforementioned embodiments, it was described in a case that the ink ejecting process is performed by the ink-jet method. However, the ink ejecting process may use other methods (e.g., other printing methods).

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A method for manufacturing a three-dimensional shaped object in which layers formed by ejecting and curing ink including a curing resin are laminated, the method comprising:

forming the layers by using a composition for three-dimensional shaped object including powder for three-dimensional shaped object constituted by particles; and ejecting an object formation ink to form a region where the three-dimensional shaped object is provided and a sacrificial layer formation ink to form a sacrificial layer in a region at a side of an outermost layer of the three-dimensional shaped object, which is adjacent to a region to become the outermost layer of the three-dimensional shaped object, during the ejecting, the object formation ink and the sacrificial layer formation ink penetrate into the layers while forming a boundary between a region where the object formation ink penetrates in the layers and a region where the sacrificial layer formation ink penetrates into the layers.

2. The method for manufacturing the three-dimensional shaped object according to claim 1, wherein the ejecting includes performing the ejecting of the object formation ink and the ejecting of the sacrificial layer formation ink within the same scanning, or within 100 milliseconds.

3. The method for manufacturing the three-dimensional shaped object according to claim 1, wherein an infiltration rate of the object formation ink and the sacrificial layer formation ink to the layers is adjusted.

4. The method for manufacturing the three-dimensional shaped object according to claim 3, wherein adjustment of the infiltration rate of the object formation ink and the sacrificial layer formation ink is performed by adjusting an ejecting amount of the object formation ink and the sacrificial layer formation ink.

5. The method for manufacturing the three-dimensional shaped object according to claim 1, wherein a curing material of the sacrificial layer formation ink has hydrophilicity.

6. The method for manufacturing the three-dimensional shaped object according to claim 1, wherein the sacrificial layer formation ink includes one or more elements selected from a group consisting of tetrahydrofurfuryl(meth)acrylate, ethoxyethoxyethyl (meth)acrylate, polyethylene glycol di(meth)acrylate, (meth)acryloyl morpholine, and (meth)acrylic acid 2-(2-vinyloxyethoxy)ethyl.

7. The method for manufacturing the three-dimensional shaped object according to claim 1, wherein the object formation ink includes one or more elements selected from a group consisting of (meth)acrylic acid 2-(2-vinyloxyethoxy)ethyl, polyether-based aliphatic urethane(meth)acrylate oligomer, 2-hydroxy-3-phenoxypropyl(meth)acrylate, and 4-hydroxybutyl(meth)acrylate.

8. The method for manufacturing the three-dimensional shaped object according to claim 1, wherein as the object formation ink, in addition to a colored ink including a coloring agent, a colorless ink that does not include the coloring agent is used, and the colorless ink is used to form the region of the outermost layer, and the colored ink is used to form a region positioned inside than the outermost layer.

9. The method for manufacturing the three-dimensional shaped object according to claim 1, wherein as the colored ink including the coloring agent, color ink and white ink are used, and the white ink is used to form a region inside than a region formed by using the colored ink.

10. The method for manufacturing the three-dimensional shaped object according to claim 1, wherein when a refractive index of the particles is denoted as $n1$, and when a refractive index of a curing material of the curing resin included in the object formation ink is denoted as $n2$, a relationship of $|n1-n2|\leq 0.2$ is satisfied.

* * * * *